United States Patent
Ihata et al.

(10) Patent No.: US 7,816,474 B2
(45) Date of Patent: Oct. 19, 2010

(54) COPOLYMER CONTAINING FUNCTIONAL GROUP OF SULFONIC ACID OR ITS SALT, AND PROCESS FOR PRODUCING SAID COPOLYMER

(75) Inventors: Osamu Ihata, Urayasu (JP); Masayuki Fujita, Chiba (JP); Hiroshi Kuribayashi, Ichihara (JP)

(73) Assignee: Sumitomo Chemcial Company, Limited, Tokyo (JP)

( * ) Notice: Subject to any disclaimer, the term of this patent is extended or adjusted under 35 U.S.C. 154(b) by 609 days.

(21) Appl. No.: 11/713,632

(22) Filed: Mar. 5, 2007

(65) Prior Publication Data
US 2007/0232767 A1 Oct. 4, 2007

(30) Foreign Application Priority Data
Mar. 30, 2006 (JP) ............... 2006-093745

(51) Int. Cl.
*C08F 12/30* (2006.01)
*C08F 228/02* (2006.01)

(52) U.S. Cl. ............. 526/287; 526/286; 526/348; 526/352; 502/103; 502/155

(58) Field of Classification Search ......... 526/243, 526/233, 352, 348, 286, 287; 502/103, 155
See application file for complete search history.

(56) References Cited

U.S. PATENT DOCUMENTS 3,128,307 A * 4/1964 Franz et al. ............ 562/828
5,648,400 A    7/1997 Sugo et al.

FOREIGN PATENT DOCUMENTS

| JP | 08-260346   | * | 10/1996 |
| JP | 8-260346 A  |   | 10/1996 |

OTHER PUBLICATIONS

Klabunde et al., "Nickel Catalysis For Ethylene Homo- And Co-Polymerization", Journal of Molecular Catalysis, 1987, vol. 41, pp. 123-134.*

Soula, R., et al., "Very Active Neutral P, O-Chelated Nickel Catalysts for Ethylene Polymerization", Macromolecules, 2001, vol. 34, pp. 2438-2442.

Truce, W. et al., "Thietane Dioxide Derivatives via the Interaction of Sulfonyl Chlorides with Ketene Diethylacetal", Journal of the American Chemical Society, 1963, vol. 20, pp. 3231-3236.

Klabunde, U. et al., "Nickel Catalysis For Ethylene Homo- And Co-Polymerization", Journal of Molecular Catalysis, 1987, vol. 41, pp. 123-134.

* cited by examiner

*Primary Examiner*—Ling-Siu Choi
(74) *Attorney, Agent, or Firm*—Foley & Lardner LLP

(57) ABSTRACT

A copolymer comprising (i) an olefin unit selected from the group consisting of an ethylene unit and an α-olefin unit having 3 to 20 carbon atoms, and (ii) a unit of a compound represented by the formula, $CH_2{=}CH{-}(R^1)_m{-}SO_3X$; and a process for producing said copolymer comprising the step of contacting (i) the above-mentioned olefin, and (ii) the above-mentioned compound with a polymerization catalyst, wherein m is a number of 0 or 1, $R^1$ is an aliphatic hydrocarbylene group having 1 to 18 carbon atoms, and X is a monovalent cationic species.

11 Claims, No Drawings

COPOLYMER CONTAINING FUNCTIONAL GROUP OF SULFONIC ACID OR ITS SALT, AND PROCESS FOR PRODUCING SAID COPOLYMER

FIELD OF THE INVENTION

The present invention relates to a copolymer containing a functional group of a sulfonic acid or its salt, and a process for producing said copolymer.

BACKGROUND OF THE INVENTION

Examples of a process for producing a hydrophilicity-carrying polymeric material are:

(1) a process comprising the step of sulfonating a synthetic pulp containing polyethylene as a major component in a concentrated sulfuric acid or a fuming sulfuric acid, thereby producing a hydrophilicity-carrying textile material (JP 8-260346A); and (2) a process comprising the step of radiation-initiated graft polymerizing hydrophilic monomers and monomers having ion-exchange groups in the presence of polymeric substances, thereby producing polymeric substances having hydrophilicity and ion-exchange groups (U.S. Pat. No. 5,648,400A).

SUMMARY OF THE INVENTION

However, there is a problem in that a polymeric material obtained by sulfonation in the above-mentioned former process (1) is limited in an amount of a functional group of a sulfonate salt contained therein depending upon a structure of a polymer to be sulfonated, or is heterogeneous because of gelation caused by sulfonation. Also, there is a problem in that a polymeric material obtained by a graft polymerization in the above-mentioned latter process (2) does not contain a large amount of a functional group of a sulfonate salt because of a poor graft polymerization-ability of a monomer having a functional group of a sulfonate salt.

In view of the above-mentioned problems in the conventional art, the present invention has an object to provide (i) a copolymer containing a functional group of a sulfonic acid or its salt in an arbitrary amount, and (ii) a process for producing said copolymer.

The present invention is a copolymer comprising (i) one or more kinds of olefin units selected from the group consisting of an ethylene unit and an α-olefin unit having 3 to 20 carbon atoms, and (ii) one or more kinds of units of a compound represented by the following formula (1),

(1)

wherein m is a number of 0 or 1; $R^1$ is an aliphatic hydrocarbylene group having 1 to 18 carbon atoms; and X is a mono-valent cationic species.

Also, the present invention is a process for producing a copolymer containing an olefin unit and a unit of a compound represented by the above-mentioned formula (1), which comprises the step of contacting (i) one or more kinds of olefins selected from the group consisting of ethylene and an α-olefin having 3 to 20 carbon atoms, and (ii) one or more kinds of compounds represented by the above-mentioned formula (1) with a polymerization catalyst.

In the present invention, the term "unit" contained in a term such as "olefin unit" means a unit of a polymerized monomer.

DETAILED DESCRIPTION OF THE INVENTION

An α-olefin in the present invention means an addition polymerizable compound having a terminal carbon-to-carbon double bond. Examples of the α-olefin having 3 to 20 carbon atoms are an olefin such as propylene, 1-butene, 1-pentene, 1-hexene, 2-methyl-1-pentene, 3-methyl-1-pentene, 3-ethyl-1-pentene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, vinylcyclohexane, isobutene, 2-methyl-1-butene, and 2,4,4-trimethyl-1-pentene; methylenecyclohexane; limonene; β-pinene; and camphene. Among them, ethylene is preferable as the olefin. The above-mentioned olefins may be used in combination of two or more thereof.

$R^1$ in the formula (1) is an aliphatic hydrocarbylene group having 1 to 18 carbon atoms, and preferably a linear aliphatic hydrocarbylene group having 1 to 18 carbon atoms. Examples of $R^1$ are a methylene group, an ethylene group, a propylene group, a butylene group, a pentylene group, a hexylene group, an octylene group, a decylene group, an undecylene group, a dodecylene group, a tridecylene group, a tetradecylene group, a pentadecylene group, a hexadecylene group, a heptadecylene group, an octadecylene group, a 2-methylpropylene group, a 3,3-dimethylpentylene group, and 1,4-cyclohexylene group.

The mono-valent cationic species X in the formula (1) is not particularly limited. Examples of the cationic species are a proton ion; an alkali metal cation such as a lithium cation, a sodium cation and a potassium cation; a transition metal cation such as a copper cation and a nickel cation; a primary ammonium cation; a secondary ammonium cation; a tertiary ammonium cation; and a quaternary ammonium cation. Among them, preferred is an alkali metal cation or an ammonium cation, and particularly preferred is a sodium cation.

Examples of the compound represented by the formula (1) are a sulfonic acid such as vinylsulfonic acid, allylsulfonic acid, 3-buten-1-sulfonic acid, 4-penten-1-sulfonic acid, 5-hexen-1-sulfonic acid, 7-octen-1-sulfonic acid, 9-decen-1-sulfonic acid, 11-dodecen-1-sulfonic acid, 13-tetradecen-1-sulfonic acid, 3-buten-2-sulfonic acid, 2-methyl-3-buten-1-sulfonic acid, 3-ethyl-4-penten-1-sulfonic acid, 5-hexen-2-sulfonic acid, 2-methyl-4-penten-2-sulfonic acid, 4-vinyl-cyclohexylsulfonic acid, and 2,3-dimethyl-5-hexen-2-sulfonic acid; and metal salts of those sulfonic acids such as sodium vinylsulfonate and sodium allylsulfonate. Among them, preferred is sodium vinylsulfonate. Those compounds may be used in combination of two or more thereof.

An example of a production process of the compound represented by the formula (1) is disclosed in Journal of the American Chemical Society, volume 20, number 85, pages 3231-3236, published on Oct. 20, 1963 by ACS Publications (America), authored by William E. Truce and John R. Norell, which uses a compound having —Br in place of —$SO_3X$ contained in the formula (1) as a starting material, said compound being a bromide corresponding to the compound represented by the formula (1). The compound represented by the formula (1) such as sodium vinylsulfonate and sodium allylsulfonate may be a commercially available one.

An example of the copolymer of the present invention is a random copolymer. Specific examples thereof are an ethylene-vinylsulfonic acid copolymer, an ethylene-allylsulfonic acid copolymer, an ethylene-3-buten-1-sulfonic acid copolymer, an ethylene-4-penten-1-sulfonic acid copolymer, an ethylene-5-hexen-1-sulfonic acid copolymer, an ethylene-7-octen-1-sulfonic acid copolymer, an ethylene-9-decen-1-sulfonic acid copolymer, an ethylene-11-dodecen-1-sulfonic acid copolymer, an ethylene-13-tetradecen-1-sulfonic acid copolymer, an ethylene-3-buten-2-sulfonic acid copolymer, an ethylene-2-methyl-3-buten-1-sulfonic acid copolymer, an ethylene-3-ethyl-4-penten-1-sulfonic acid copolymer, an ethylene-5-hexen-2-sulfonic acid copolymer, an ethylene-2-methyl-4-penten-2-sulfonic acid copolymer, an ethylene-4-vinylcyclohexylsulfonic acid copolymer, an ethylene-2,3-dimethyl-5-hexen-2-sulfonic acid copolymer, and copolymers obtained by replacing H of —SO$_3$H contained in those copolymers with a mono-valent cation; a propylene-vinylsulfonic acid copolymer, a propylene-allylsulfonic acid copolymer, a propylene-3-buten-1-sulfonic acid copolymer, a propylene-4-penten-1-sulfonic acid copolymer, a propylene-5-hexen-1-sulfonic acid copolymer, a propylene-7-octen-1-sulfonic acid copolymer, a propylene-9-decen-1-sulfonic acid copolymer, a propylene-11-dodecen-1-sulfonic acid copolymer, a propylene-13-tetradecen-1-sulfonic acid copolymer, a propylene-3-buten-2-sulfonic acid copolymer, a propylene-2-methyl-3-buten-1-sulfonic acid copolymer, a propylene-3-ethyl-4-penten-1-sulfonic acid copolymer, a propylene-5-hexen-2-sulfonic acid copolymer, a propylene-2-methyl-4-penten-2-sulfonic acid copolymer, a propylene-4-vinylcyclohexylsulfonic acid copolymer, a propylene-2,3-dimethyl-5-hexen-2-sulfonic acid copolymer, and copolymers obtained by replacing H of —SO$_3$H contained in those copolymers with a mono-valent cation; and a 1-hexene-vinylsulfonic acid copolymer, a 1-hexene-allylsulfonic acid copolymer, a 1-hexene-3-buten-1-sulfonic acid copolymer, a 1-hexene-4-penten-1-sulfonic acid copolymer, a 1-hexene-5-hexen-1-sulfonic acid copolymer, a 1-hexene-7-octen-1-sulfonic acid copolymer, a 1-hexene-9-decen-1-sulfonic acid copolymer, a 1-hexene-11-dodecen-1-sulfonic acid copolymer, a 1-hexene-13-tetradecen-1-sulfonic acid copolymer, a 1-hexene-3-buten-2-sulfonic acid copolymer, a 1-hexene-2-methyl-3-buten-1-sulfonic acid copolymer, a 1-hexene-3-ethyl-4-penten-1-sulfonic acid copolymer, a 1-hexene-5-hexen-2-sulfonic acid copolymer, a 1-hexene-2-methyl-4-penten-2-sulfonic acid copolymer, a 1-hexene-4-vinylcyclohexylsulfonic acid copolymer, a 1-hexene-2,3-dimethyl-5-hexen-2-sulfonic acid copolymer, and copolymers obtained by replacing H of —SO$_3$H contained in those copolymers with a mono-valent cation.

A polymerization catalyst in the present invention is preferably a transition metal compound represented by the following formula (2), (3) or (4):

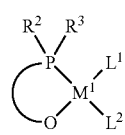

(2)

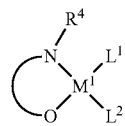

(3)

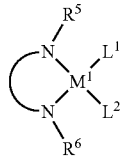

(4)

wherein $M^1$ is a transition metal atom of the groups 8 to 10 in the periodic table of elements; the curved line between the phosphor atom and the oxygen atom in the formula (2), the curved line between the nitrogen atom and the oxygen atom in the formula (3), and the curved line between the two nitrogen atoms in the formula (4) are a hydrocarbylene group having two or more carbon atoms, respectively; $R^2, R^3, R^4, R^5$ and $R^6$ are independently of one another an aromatic hydrocarbyl group or an aliphatic hydrocarbyl group; and $L^1$ and $L^2$ are independently of each other a hydrogen atom, a halogen atom, an aromatic hydrocarbyl group, an aliphatic hydrocarbyl group or a neutral ligand coordinating to $M^1$ through a lone pair of electrons.

Examples of $M^1$ are an iron atom, a cobalt atom, a nickel atom, a ruthenium atom, a rhodium atom, a palladium atom, an osmium atom, an iridium atom and a platinum atom. Among them, preferred is a nickel atom.

Examples of the halogen atom of $L^1$ and $L^2$ are a fluorine atom, a chlorine atom, a bromine atom and an iodine atom.

Examples of the aromatic hydrocarbyl group of $L^1$ and $L^2$ are a phenyl group, a 4-methylphenyl group, a naphthyl group, a benzyl group, and a phenylethyl group.

Examples of the aliphatic hydrocarbyl group of $L^1$ and $L^2$ are a linear saturated hydrocarbyl group such as a methyl group, an ethyl group, a n-propyl group, a n-butyl group, an isopropyl group, a sec-butyl group, a tert-butyl group, a cyclopropyl group, a cyclobutyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group; a branched saturated hydrocarbyl group such as a sec-pentyl group, a neopentyl group, a sec-hexyl group, a sec-heptyl group, a sec-octyl group, a sec-nonyl group, a sec-decyl group, a sec-undecyl group, a sec-dodecyl group, a sec-tridecyl group, a sec-tetradecyl group, a sec-pentadecyl group, a sec-hexadecyl group, a sec-heptadecyl group, a sec-octadecyl group, a sec-nonadecyl group, and a sec-eicosyl group; and a cyclic saturated hydrocarbyl group such as a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group, a cyclononadecyl group, and a cycloeicosyl group.

Examples of the neutral ligand of $L^1$ and $L^2$ are a phosphine derivative, a pyridine derivative and a cyano compound. Specific examples of the phosphine derivative are triphenylphosphine, dimethylphenylphosphine, tri-n-butylphosphine, bis(diphenylphosphino)butane, bis(diphenylphosphino)propane, and tri-n-butylphosphine oxide. Specific examples of the pyridine derivative are pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,4, 6-trimethylpyridine, 2,6-di-tert-butylpyridine, and 2,4-di-tert-butylpyridine. A specific example of the cyano compound is acetonitrile. $L^1$ and $L^2$ are preferably a methyl group, a phenyl group, triphenylphosphine, or pyridine.

The transition metal compounds represented by the formulas (2) to (4) can be produced according to a method disclosed in Chemical Reviews, number 100, pages 1169-1203, published on Mar. 25, 2000 by ACS Publications (America), authored by Steven D. Ittel, Lynda K. Johnson and Maurice Brookhart, which method comprises the steps of:

(1) introducing a target ligand into a starting compound, which is usually a transition metal compound containing a ligand and a linkage of a transition metal atom with a halogen atom, thereby forming an intermediate compound containing the target ligand; and (2) modifying the intermediate compound if needed.

For example, when using a starting compound of a transition metal compound containing a ligand such as a dimethoxyethane ligand and a 1,5-cyclooctadiene ligand, and a linkage of a transition metal atom with a halogen atom, a method for producing the transition metal compounds represented by the formulas (2) to (4) comprises the steps of:

(1) introducing a target ligand into a starting compound according to an exchange reaction of an original ligand such as a dimethoxyethane ligand and a 1,5-cyclooctadiene ligand with the target ligand, thereby forming an intermediate compound containing the target ligand; and (2) modifying the intermediate compound according to (2-1) a cleaving reaction of a linkage between a transition metal atom and a halogen atom by use of a reagent such as dimethylmagnesium, thereby forming a linkage of a transition metal atom with an alkyl group such as a methyl group (namely, alkylation reaction), or (2-2) a halogen-abstraction reaction with a reagent such as sodium tetrakis[3,5-bis(trifluoromethyl)phenyl]borate in a solvent such as acetonitrile, thereby coordinating a ligand such as acetonitrile to the transition metal.

The transition metal compound represented by the formula (2) is more preferably a transition metal compound represented by the following formula (2-1) or (2-2):

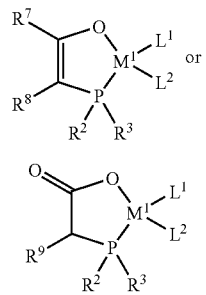

(2-1)

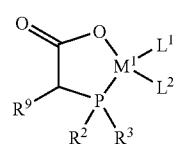

(2-2)

wherein $R^7$ is an aromatic hydrocarbyl group or a halogenated hydrocarbyl group; $R^8$ is a group of a sulfonate salt, an aliphatic hydrocarbyl ester group having 1 to 10 carbon atoms, or a carboxyl group; and $R^9$ is an aromatic hydrocarbyl group, an aliphatic hydrocarbyl group or an aliphatic hydrocarbyl ester group having 1 to 10 carbon atoms, or a carboxyl group.

Examples of the aromatic hydrocarbyl group of $R^7$ are a phenyl group, a 4-methylphenyl group, a naphthyl group, a benzyl group, and a phenylethyl group. Examples of the halogenated hydrocarbyl group of $R^7$ are a trifluoromethyl group, a trichloromethyl group, a tribromomethyl group, a pentafluoroethyl group, a pentachloroethyl group, a pentabromoethyl group, a pentafluorophenyl group, a pentafluoropropyl group, a pentachloropropyl group, and a heptabromopropyl group. Among them, preferred is a 4-methylphenyl group or a trifluoromethyl group.

Examples of a counter cationic species composing the group of a sulfonate salt of $R^8$ are a mono-valent metal cation of an atom such as a sodium atom, a potassium atom and a lithium atom; a primary ammonium cation; a secondary ammonium cation; a tertiary ammonium cation; and a quaternary ammonium cation. Among them, preferred is a sodium sulfonate group or a methyl ester group.

Examples of the aromatic hydrocarbyl group of $R^9$ are a phenyl group, a 4-methylphenyl group, a naphthyl group, a benzyl group, and a phenylethyl group. Examples of the aliphatic hydrocarbyl group of $R^9$ are a linear saturated hydrocarbyl group such as a methyl group, an ethyl group, a n-propyl group, a n-butyl group, an isopropyl group, a sec-butyl group, a tert-butyl group, a cyclopropyl group, a cyclobutyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group; a branched saturated hydrocarbyl group such as a sec-pentyl group, a neopentyl group, a sec-hexyl group, a sec-heptyl group, a sec-octyl group, a sec-nonyl group, a sec-decyl group, a sec-undecyl group, a sec-dodecyl group, a sec-tridecyl group, a sec-tetradecyl group, a sec-pentadecyl group, a sec-hexadecyl group, a sec-heptadecyl group, a sec-octadecyl group, a sec-nonadecyl group, and a sec-eicosyl group; and a cyclic saturated hydrocarbyl group such as a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group, a cyclononadecyl group, and a cycloeicosyl group. Among them, preferred is a phenyl group or a carboxyl group.

The transition metal compound represented by the formula (3) is more preferably a transition metal compound represented by the following formula (3-1):

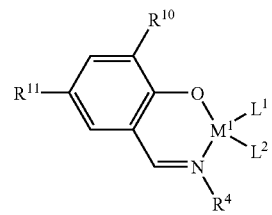

(3-1)

wherein $R^{10}$ and $R^{11}$ are independently of each other a hydrogen atom, a nitro group, a halogen atom, an aromatic hydrocarbyl group, or an aliphatic hydrocarbyl group. Examples of the halogen atom are a fluorine atom, a chlorine atom, a bromine atom and an iodine atom. Examples of the aromatic hydrocarbyl group are a phenyl group, a 4-methylphenyl group, a naphthyl group, a benzyl group, and a phenylethyl group. Examples of the aliphatic hydrocarbyl group are a linear saturated hydrocarbyl group such as a methyl group, an ethyl group, a n-propyl group, a n-butyl group, an isopropyl group, a sec-butyl group, a tert-butyl group, a cyclopropyl group, a cyclobutyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group; a branched saturated hydrocarbyl group such as a sec-pentyl group, a neopentyl group, a sec-hexyl group, a sec-heptyl group, a sec-octyl group, a sec-nonyl group, a sec-decyl group, a sec-undecyl group, a sec-dodecyl group, a sec-tridecyl group, a sec-tetradecyl group, a sec-pentadecyl group, a sec-hexadecyl group, a sec-heptadecyl group, a sec-octadecyl group, a sec-nonadecyl group, and a sec-eicosyl group; and a cyclic saturated hydrocarbyl group such as a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group, a cyclononadecyl group, and a cycloeicosyl group. Among them, preferred is a hydrogen atom, a tert-butyl group, a phenyl group, a nitro group, a chlorine atom or a bromine atom.

The transition metal compound represented by the formula (4) is more preferably a transition metal compound represented by the following formula (4-1):

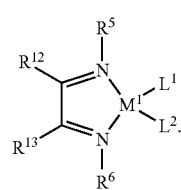

(4-1)

wherein $R^{12}$ and $R^{13}$ are independently of each other a hydrogen atom, an aromatic hydrocarbyl group, or an aliphatic hydrocarbyl group. Examples of the aromatic hydrocarbyl group are a phenyl group, a 4-methylphenyl group, a naphthyl group, a benzyl group, and a phenylethyl group. Examples of the aliphatic hydrocarbyl group are a linear saturated hydrocarbyl group such as a methyl group, an ethyl group, a n-propyl group, a n-butyl group, an isopropyl group, a sec-butyl group, a tert-butyl group, a cyclopropyl group, a cyclobutyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group; a branched saturated hydrocarbyl group such as a sec-pentyl group, a neopentyl group, a sec-hexyl group, a sec-heptyl group, a sec-octyl group, a sec-nonyl group, a sec-decyl group, a sec-undecyl group, a sec-dodecyl group, a sec-tridecyl group, a sec-tetradecyl group, a sec-pentadecyl group, a sec-hexadecyl group, a sec-heptadecyl group, a sec-octadecyl group, a sec-nonadecyl group, and a sec-eicosyl group; and a cyclic saturated hydrocarbyl group such as a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group, a cyclononadecyl group, and a cycloeicosyl group. Among them, preferred is a hydrogen atom, a methyl group or a phenyl group.

Examples of the transition metal compound represented by the formula (2-1) are

[sodium 1-(diphenylphosphino-κP)-2-(hydroxo-κO)-2-phenyl ethenesulfonate]phenyl(pyridine)nickel(II),

[sodium 1-(diphenylphosphino-κP)-2-(hydroxo-κO)-2-(4-methyl phenyl)ethenesulfonate]phenyl(pyridine)nickel (II),

[sodium 1-(diphenylphosphino-κP)-2-(hydroxo-κO)-2-benzyl ethenesulfonate]phenyl(pyridine)nickel(II),

[sodium 1-(diphenylphosphino-κP)-2-(hydroxo-κO)-3,3,3-trifluoro-1-propene-1-sulfonate]phenyl(pyridine)nickel (II),

[sodium 1-(diphenylphosphino-κP)-2-(hydroxo-κO)-3,3,3-trichloro-1-propene-1-sulfonate]phenyl(pyridine)nickel (II),

[methyl-2-(diphenylphosphino-κP)-3-phenyl-3-(hydroxo-κO)-2-propenoate]phenyl(pyridine)nickel(II),

[methyl-2-(diphenylphosphino-κP)-3-(4-methylphenyl)-3-(hydroxo-κO)-2-propenoate]phenyl(pyridine)nickel(II),

[methyl-2-(diphenylphosphino-κP)-5,5,5-trifluoro-4,4-difluoro-3-(hydroxo-κO)-2-pentenoate]phenyl(pyridine) nickel(II),

[methyl-2-(diphenylphosphino-κP)-4,4,4-trifluoro-3-(hydroxo-κO)-2-butenoate]phenyl(pyridine)nickel(II),

[methyl-2-(diphenylphosphino-κP)-4,4,4-trichloro-3-(hydroxo-κO)-2-butenoate]phenyl(pyridine)nickel(II),

[sodium 1-(diphenylphosphino-κP)-2-(hydroxo-κO)-2-phenyl ethenesulfonate]phenyl(triphenylphosphine)nickel (II),

[sodium 1-(diphenylphosphino-κP)-2-(hydroxo-κO)-2-(4-methyl phenyl)ethenesulfonate]phenyl(triphenylphosphine)nickel(II),

[sodium 1-(diphenylphosphino-κP)-2-(hydroxo-κO)-2-benzyl ethenesulfonate]phenyl(triphenylphosphine)nickel (II),

[sodium 1-(diphenylphosphino-κP)-2-(hydroxo-κO)-3,3,3-trifluoro-1-propene-1-sulfonate]phenyl(triphenylphosphine) nickel(II),

[sodium 1-(diphenylphosphino-κP)-2-(hydroxo-κO)-3,3,3-trichloro-1-propene-1-sulfonate]phenyl(triphenylphosphine) nickel(II),

[methyl-2-(diphenylphosphino-κP)-3-phenyl-3-(hydroxo-κO)-2-propenoate]phenyl(triphenylphosphine)nickel(II),

[methyl-2-(diphenylphosphino-κP)-3-(4-methylphenyl)-3-(hydroxo-κO)-2-propenoate]phenyl(triphenylphosphine) nickel(II),

[methyl-2-(diphenylphosphino-κP)-5,5,5-trifluoro-4,4-difluoro-3-(hydroxo-κO)-2-pentenoate]phenyl(triphenyl phosphine)nickel(II),

[methyl-2-(diphenylphosphino-κP)-4,4,4-trifluoro-3-(hydroxo-κO)-2-butenoate]phenyl(triphenylphosphine) nickel(II),

[methyl-2-(diphenylphosphino-κP)-4,4,4-trichloro-3-(hydroxo-κO)-2-butenoate]phenyl(triphenylphosphine) nickel(II),

[sodium 1-[bis(n-butyl)phosphino-κP]-2-(hydroxo-κO)-2-phenyl ethenesulfonate](n-butyl)(pyridine)nickel(II),

[sodium 1-[bis(n-butyl)phosphino-κP]-2-(hydroxo-κO)-2-(4-methylphenyl)ethenesulfonate](n-butyl)(pyridine) nickel(II),

[sodium 1-[bis(n-butyl)phosphino-κP]-2-(hydroxo-κO)-2-benzyl ethenesulfonate](n-butyl)(pyridine)nickel(II),

[sodium 1-[bis(n-butyl)phosphino-κP]-2-(hydroxo-κO)-3,3,3-trifluoro-1-propene-1-sulfonate](n-butyl)(pyridine) nickel(II),

[sodium 1-[bis(n-butyl)phosphino-κP]-2-(hydroxo-κO)-3,3,3-trichloro-1-propene-1-sulfonate](n-butyl)(pyridine)nickel(II),
[methyl-2-[bis(n-butyl)phosphino-κP]-3-phenyl-3-(hydroxo-κO)-2-propenoate](n-butyl)(pyridine)nickel(II),
[methyl-2-[bis(n-butyl)phosphino-κP]-3-(4-methylphenyl)-3-(hydroxo-κO)-2-propenoate](n-butyl)(pyridine)nickel(II),
[methyl-2-[bis(n-butyl)phosphino-κP]-5,5,5-trifluoro-4,4-difluoro-3-(hydroxo-κO)-2-pentenoate](n-butyl)(pyridine) nickel(II),
[methyl-2-[bis(n-butyl)phosphino-κP]-4,4,4-trifluoro-3-(hydroxo-κO)-2-butenoate](n-butyl)(pyridine)nickel(II),
[methyl-2-[bis(n-butyl)phosphino-κP]-4,4,4-trichloro-3-(hydroxo-κO)-2-butenoate](n-butyl) (pyridine)nickel(II),
[sodium 1-[bis(n-butyl)phosphino-κP]-2-(hydroxo-κO)-2-phenyl ethenesulfonate](n-butyl)(triphenylphosphine) nickel(II),
[sodium 1-[bis(n-butyl)phosphino-κP]-2-(hydroxo-κO)-2-(4-methylphenyl)ethenesulfonate](n-butyl)(triphenylphosphine) nickel(II),
[sodium 1-[bis(n-butyl)phosphino-κP]-2-(hydroxo-κO)-2-benzyl ethenesulfonate](n-butyl)(triphenylphosphine) nickel(II),
[sodium 1-[bis(n-butyl)phosphino-κP]-2-(hydroxo-κO)-3,3,3-trifluoro-1-propene-1-sulfonate](n-butyl)(triphenylphosphine) nickel(II),
[sodium 1-[bis(n-butyl)phosphino-κP]-2-(hydroxo-κO)-3,3,3-trichloro-1-propene-1-sulfonate](n-butyl)(triphenylphosphine) nickel(II),
[methyl-2-[bis(n-butyl)phosphino-κP]-3-phenyl-3-(hydroxo-κO)-2-propenoate](n-butyl)(triphenylphosphine) nickel(II),
[methyl-2-[bis(n-butyl)phosphino-κP]-3-(4-methylphenyl)-3-(hydroxo-κO)-2-propenoate](n-butyl) (triphenylphosphine) nickel(II),
[methyl-2-[bis(n-butyl)phosphino-κP]-5,5,5-trifluoro-4,4-difluoro-3-(hydroxo-κO)-2-pentenoate](n-butyl)(triphenyl phosphine)nickel(II),
[methyl-2-[bis(n-butyl)phosphino-κP]-4,4,4-trifluoro-3-(hydroxo-κO)-2-butenoate](n-butyl)(triphenylphosphine) nickel(II),
[methyl-2-[bis(n-butyl)phosphino-κP]-4,4,4-trichloro-3-(hydroxo-κO)-2-butenoate](n-butyl) (triphenylphosphine) nickel(II),
[sodium 1-(diphenylphosphino-κP)-2-(hydroxo-κO)-2-phenyl ethenesulfonate]phenyl(pyridine)palladium(II),
[sodium 1-(diphenylphosphino-κP)-2-(hydroxo-κO)-2-(4-methyl phenyl)ethenesulfonate]phenyl(pyridine)palladium(II),
[sodium 1-(diphenylphosphino-κP)-2-(hydroxo-κO)-2-benzyl ethenesulfonate]phenyl(pyridine)palladium(II),
[sodium 1-(diphenylphosphino-κP)-2-(hydroxo-κO)-3,3,3-trifluoro-1-propene-1-sulfonate]phenyl(pyridine) palladium(II),
[sodium 1-(diphenylphosphino-κP)-2-(hydroxo-κO)-3,3,3-trichloro-1-propene-1-sulfonate]phenyl(pyridine) palladium(II),
[methyl-2-(diphenylphosphino-κP)-3-phenyl-3-(hydroxo-κO)-2-propenoate]phenyl(pyridine)palladium(II),
[methyl-2-(diphenylphosphino-κP)-3-(4-methylphenyl)-3-(hydroxo-κO)-2-propenoate]phenyl(pyridine)palladium(II),
[methyl-2-(diphenylphosphino-κP)-5,5,5-trifluoro-4,4-difluoro-3-(hydroxo-κO)-2-pentenoate]phenyl(pyridine) palladium(II),
[methyl-2-(diphenylphosphino-κP)-4,4,4-trifluoro-3-(hydroxo-κO)-2-butenoate]phenyl(pyridine)palladium(II),
[methyl-2-(diphenylphosphino-κP)-4,4,4-trichloro-3-(hydroxo-κO)-2-butenoate]phenyl(pyridine)palladium(II),
[sodium 1-(diphenylphosphino-κP)-2-(hydroxo-κO)-2-phenyl ethenesulfonate]phenyl(triphenylphosphine)palladium(II),
[sodium 1-(diphenylphosphino-κP)-2-(hydroxo-κO)-2-(4-methyl phenyl)ethenesulfonate]phenyl(triphenylphosphine) palladium(II),
[sodium 1-(diphenylphosphino-κP)-2-(hydroxo-κO)-2-benzyl ethenesulfonate]phenyl(triphenylphosphine)palladium(II),
[sodium 1-(diphenylphosphino-κP)-2-(hydroxo-κO)-3,3,3-trifluoro-1-propene-1-sulfonate]phenyl(triphenylphosphine) palladium(II),
[sodium 1-(diphenylphosphino-κP)-2-(hydroxo-κO)-3,3,3-trichloro-1-propene-1-sulfonate]phenyl(triphenylphosphine) palladium(II),
[methyl-2-(diphenylphosphino-κP)-3-phenyl-3-(hydroxo-κO)-2-propenoate]phenyl(triphenylphosphine)palladium(II),
[methyl-2-(diphenylphosphino-κP)-3-(4-methylphenyl)-3-(hydroxo-κO)-2-propenoate]phenyl(triphenylphosphine) palladium(II),
[methyl-2-(diphenylphosphino-κP)-5,5,5-trifluoro-4,4-difluoro-3-(hydroxo-κO)-2-pentenoate]phenyl(triphenyl phosphine)palladium(II),
[methyl-2-(diphenylphosphino-κP)-4,4,4-trifluoro-3-(hydroxo-κO)-2-butenoate]phenyl(triphenylphosphine)palladium(II),
[methyl-2-(diphenylphosphino-κP)-4,4,4-trichloro-3-(hydroxo-κO)-2-butenoate]phenyl(triphenylphosphine)palladium(II),
[sodium 1-[bis(n-butyl)phosphino-κP]-2-(hydroxo-κO)-2-phenyl ethenesulfonate](n-butyl)(pyridine)palladium(II),
[sodium 1-[bis(n-butyl)phosphino-κP]-2-(hydroxo-κO)-2-(4-methylphenyl)ethenesulfonate](n-butyl)(pyridine) palladium(II),
[sodium 1-[bis(n-butyl)phosphino-κP]-2-(hydroxo-κO)-2-benzyl ethenesulfonate](n-butyl)(pyridine)palladium(II),
[sodium 1-[bis(n-butyl)phosphino-κP]-2-(hydroxo-κO)-3,3,3-trifluoro-1-propene-1-sulfonate](n-butyl)(pyridine) palladium(II),
[sodium 1-[bis(n-butyl)phosphino-κP]-2-(hydroxo-κO)-3,3,3-trichloro-1-propene-1-sulfonate](n-butyl)(pyridine) palladium(II),
[methyl-2-[bis(n-butyl)phosphino-κP]-3-phenyl-3-(hydroxo-κO)-2-propenoate](n-butyl)(pyridine)palladium(II),
[methyl-2-[bis(n-butyl)phosphino-κP]-3-(4-methylphenyl)-3-(hydroxo-κO)-2-propenoate](n-butyl)(pyridine)palladium(II),
[methyl-2-[bis(n-butyl)phosphino-κP]-5,5,5-trifluoro-4,4-difluoro-3-(hydroxo-κO)-2-pentenoate](n-butyl)(pyridine) palladium(II),
[methyl-2-[bis(n-butyl)phosphino-κP]-4,4,4-trifluoro-3-(hydroxo-κO)-2-butenoate](n-butyl)(pyridine)palladium(II),
[methyl-2-[bis(n-butyl)phosphino-κP]-4,4,4-trichloro-3-(hydroxo-κO)-2-butenoate](n-butyl)(pyridine)palladium(II),
[sodium 1-[bis(n-butyl)phosphino-κP]-2-(hydroxo-κO)-2-phenyl ethenesulfonate](n-butyl)(triphenylphosphine)palladium(II),

[sodium 1-[bis(n-butyl)phosphino-κP]-2-(hydroxo-κO)-2-(4-methylphenyl)ethenesulfonate](n-butyl)(triphenylphosphine) palladium(II),
[sodium 1-[bis(n-butyl)phosphino-κP]-2-(hydroxo-κO)-2-benzyl ethenesulfonate](n-butyl)(triphenylphosphine)palladium(II),
[sodium 1-[bis(n-butyl)phosphino-κP]-2-(hydroxo-κO)-3,3,3-trifluoro-1-propene-1-sulfonate](n-butyl)(triphenylphosphine) palladium(II),
[sodium 1-[bis(n-butyl)phosphino-κP]-2-(hydroxo-κO)-3,3,3-trichloro-1-propene-1-sulfonate](n-butyl)(triphenylphosphine) palladium(II),
[methyl-2-[bis(n-butyl)phosphino-κP]-3-phenyl-3-(hydroxo-κO)-2-propenoate](n-butyl)(triphenylphosphine) palladium(II),
[methyl-2-[bis(n-butyl)phosphino-κP]-3-(4-methylphenyl)-3-(hydroxo-κO)-2-propenoate](n-butyl) (triphenylphosphine) palladium(II),
[methyl-2-[bis(n-butyl)phosphino-κP]-5,5,5-trifluoro-4,4-difluoro-3-(hydroxo-κO)-2-pentenoate](n-butyl) (triphenyl phosphine)palladium(II),
[methyl-2-[bis(n-butyl)phosphino-κP]-4,4,4-trifluoro-3-(hydroxo-κO)-2-butenoate](n-butyl)(triphenylphosphine) palladium(II), and
[methyl-2-[bis(n-butyl)phosphino-κP]-4,4,4-trichloro-3-(hydroxo-κO)-2-butenoate](n-butyl) (triphenylphosphine) palladium(II).

Examples of the transition metal compound represented by the formula (2-2) are
[2-(diphenylphosphino-κP)-2-carboxylpropanoato-κO](triphenylphosphine)nickel(II) hydride,
[2-(diphenylphosphino-κP)-2-carboxylpropanoato-κO]methyl (triphenylphosphine)nickel(II),
[2-(diphenylphosphino-κP)-2-carboxylpropanoato-κO]phenyl (triphenylphosphine)nickel(II),
[2-(diphenylphosphino-κP)-2-carboxylpropanoato-κO](n-butyl) (triphenylphosphine)nickel(II),
[2-(diphenylphosphino-κP)-2-carboxylpropanoato-κO](pyridine)nickel(II) hydride,
[2-(diphenylphosphino-κP)-2-carboxylpropanoato-κO]methyl (pyridine)nickel(II),
[2-(diphenylphosphino-κP)-2-carboxylpropanoato-κO]phenyl (pyridine)nickel(II),
[2-(diphenylphosphino-κP)-2-carboxylpropanoato-κO](n-butyl) (pyridine)nickel(II),
[2-(diphenylphosphino-κP)-2-(methoxycarbonyl)propanoato-κO](triphenylphosphine)nickel(II) hydride,
[2-(diphenylphosphino-κP)-2-(methoxycarbonyl)propanoato-κO]methyl(triphenylphosphine)nickel(II),
[2-(diphenylphosphino-κP)-2-(methoxycarbonyl)propanoato-κO]phenyl(triphenylphosphine)nickel(II),
[2-(diphenylphosphino-κP)-2-(methoxycarbonyl)propanoato-κO](n-butyl)(triphenylphosphine)nickel(II),
[2-(diphenylphosphino-κP)-2-(methoxycarbonyl)propanoato-κO](pyridine)nickel(II) hydride,
[2-(diphenylphosphino-κP)-2-(methoxycarbonyl)propanoato-κO]methyl(pyridine)nickel(II),
[2-(diphenylphosphino-κP)-2-(methoxycarbonyl)propanoato-κO]phenyl(pyridine)nickel(II),
[2-(diphenylphosphino-κP)-2-(methoxycarbonyl)propanoato-κO](n-butyl)(pyridine)nickel(II),
[2-[bis(n-butyl)phosphino-κP]-2-carboxylpropanoato-κO](triphenylphosphine)nickel(II) hydride,
[2-[bis(n-butyl)phosphino-κP]-2-carboxylpropanoato-κO]methyl(triphenylphosphine)nickel(II),
[2-[bis(n-butyl)phosphino-κP]-2-carboxylpropanoato-κO]phenyl(triphenylphosphine)nickel(II),
[2-[bis(n-butyl)phosphino-κP]-2-carboxylpropanoato-κO](n-butyl)(triphenylphosphine)nickel(II),
[2-[bis(n-butyl)phosphino-κP]-2-carboxylpropanoato-κO](pyridine)nickel(II) hydride,
[2-[bis(n-butyl)phosphino-κP]-2-carboxylpropanoato-κO]methyl(pyridine)nickel(II),
[2-[bis(n-butyl)phosphino-κP]-2-carboxylpropanoato-κO]phenyl(pyridine)nickel(II),
[2-[bis(n-butyl)phosphino-κP]-2-carboxylpropanoato-κO](n-butyl)(pyridine)nickel(II),
[2-[bis(n-butyl)phosphino-κP]-2-(methoxycarbonyl)propanoato-κO](triphenylphosphine)nickel(II) hydride,
[2-[bis(n-butyl)phosphino-κP]-2-(methoxycarbonyl)propanoato-κO]methyl(triphenylphosphine)nickel(II),
[2-[bis(n-butyl)phosphino-κP]-2-(methoxycarbonyl)propanoato-κO]phenyl(triphenylphosphine)nickel(II),
[2-[bis(n-butyl)phosphino-κP]-2-(methoxycarbonyl)propanoato-κO](n-butyl)(triphenylphosphine)nickel(II),
[2-[bis(n-butyl)phosphino-κP]-2-(methoxycarbonyl)propanoato-κO](pyridine)nickel(II) hydride,
[2-[bis(n-butyl)phosphino-κP]-2-(methoxycarbonyl)propanoato-κO]methyl(pyridine)nickel(II),
[2-[bis(n-butyl)phosphino-κP]-2-(methoxycarbonyl)propanoato-κO]phenyl(pyridine)nickel(II),
[2-[bis(n-butyl)phosphino-κP]-2-(methoxycarbonyl)propanoato-κO](n-butyl)(pyridine)nickel(II),
[2-(diphenylphosphino-κP)-2-carboxylpropanoato-κO](triphenylphosphine)palladium(II) hydride,
[2-(diphenylphosphino-κP)-2-carboxylpropanoato-κO]methyl (triphenylphosphine)palladium(II),
[2-(diphenylphosphino-κP)-2-carboxylpropanoato-κO]phenyl (triphenylphosphine)palladium(II),
[2-(diphenylphosphino-κP)-2-carboxylpropanoato-κO](n-butyl) (triphenylphosphine)palladium(II),
[2-(diphenylphosphino-κP)-2-carboxylpropanoato-κO](pyridine)palladium(II)hydride,
[2-(diphenylphosphino-κP)-2-carboxylpropanoato-κO]methyl (pyridine)palladium(II),
[2-(diphenylphosphino-κP)-2-carboxylpropanoato-κO]phenyl (pyridine)palladium(II),
[2-(diphenylphosphino-κP)-2-carboxylpropanoato-κO](n-butyl) (pyridine)palladium(II),
[2-(diphenylphosphino-κP)-2-(methoxycarbonyl)propanoato-κO](triphenylphosphine)palladium(II) hydride,
[2-(diphenylphosphino-κP)-2-(methoxycarbonyl)propanoato-κO]methyl(triphenylphosphine)palladium(II),
[2-(diphenylphosphino-κP)-2-(methoxycarbonyl)propanoato-κO]phenyl(triphenylphosphine)palladium(II),
[2-(diphenylphosphino-κP)-2-(methoxycarbonyl)propanoato-κO](n-butyl)(triphenylphosphine)palladium(II),
[2-(diphenylphosphino-κP)-2-(methoxycarbonyl)propanoato-κO](pyridine)palladium(II) hydride,
[2-(diphenylphosphino-κP)-2-(methoxycarbonyl)propanoato-κO]methyl(pyridine)palladium(II),
[2-(diphenylphosphino-κP)-2-(methoxycarbonyl)propanoato-κO]phenyl(pyridine)palladium(II),
[2-(diphenylphosphino-κP)-2-(methoxycarbonyl)propanoato-κO](n-butyl)(pyridine)palladium(II),
[2-[bis(n-butyl)phosphino-κP]-2-carboxylpropanoato-κO](triphenylphosphine)palladium(II) hydride,
[2-[bis(n-butyl)phosphino-κP]-2-carboxylpropanoato-κO]methyl(triphenylphosphine)palladium(II),
[2-[bis(n-butyl)phosphino-κP]-2-carboxylpropanoato-κO]phenyl(triphenylphosphine)palladium(II),
[2-[bis(n-butyl)phosphino-κP]-2-carboxylpropanoato-κO](n-butyl)(triphenylphosphine)palladium(II),

[2-[bis(n-butyl)phosphino-κP]-2-carboxylpropanoato-κO] (pyridine)palladium(II) hydride,
[2-[bis(n-butyl)phosphino-κP]-2-carboxylpropanoato-κO] methyl(pyridine)palladium(II),
[2-[bis(n-butyl)phosphino-κP]-2-carboxylpropanoato-κO] phenyl(pyridine)palladium(II),
[2-[bis(n-butyl)phosphino-κP]-2-carboxylpropanoato-κO] (n-butyl)(pyridine)palladium(II),
[2-[bis(n-butyl)phosphino-κP]-2-(methoxycarbonyl)propanoato-κO](triphenylphosphine)palladium(II) hydride,
[2-[bis(n-butyl)phosphino-κP]-2-(methoxycarbonyl)propanoato-κO]methyl(triphenylphosphine)palladium(II),
[2-[bis(n-butyl)phosphino-κP]-2-(methoxycarbonyl)propanoato-K O]phenyl(triphenylphosphine)palladium(II),
[2-[bis(n-butyl)phosphino-κP]-2-(methoxycarbonyl)propanoato-κO](n-butyl)(triphenylphosphine)palladium(II),
[2-[bis(n-butyl)phosphino-κP]-2-(methoxycarbonyl)propanoato-κO](pyridine)palladium(II) hydride,
[2-[bis(n-butyl)phosphino-κP]-2-(methoxycarbonyl)propanoato-κO]methyl(pyridine)palladium(II),
[2-[bis(n-butyl)phosphino-κP]-2-(methoxycarbonyl)propanoato-κO]phenyl(pyridine)palladium(II), and
[2-[bis(n-butyl)phosphino-κP]-2-(methoxycarbonyl)propanoato-κO](n-butyl)(pyridine)palladium(II).

Examples of the transition metal compound represented by the formula (3-1) are
[6-[(phenylimino-κN)methyl]phenolato-κO]dimethylnickel(II),
[6-[(phenylimino-κN)methyl]phenolato-κO]methylphenyl nickel(II),
[6-[(phenylimino-κN)methyl]phenolato-κO]methyl(triphenyl phosphine)nickel(II),
[6-[(phenylimino-κN)methyl]phenolato-κO]phenyl(triphenyl phosphine)nickel(II),
[6-[(phenylimino-κN)methyl]phenolato-κO]methyl(pyridine) nickel(II),
[6-[(phenylimino-κN)methyl]phenolato-κO]phenyl(pyridine) nickel(II),
[6-[[2,6-bis(2-propyl)phenylimino-κN)methyl]phenolato-κO]dimethylnickel(II),
[6-[[2,6-bis(2-propyl)phenylimino-κN)methyl]phenolato-κO]methylphenylnickel(II),
[6-[[2,6-bis(2-propyl)phenylimino-κN)methyl]phenolato-κO]methyl(triphenylphosphine)nickel(II),
[6-[[2,6-bis(2-propyl)phenylimino-κN)methyl]phenolato-κO]phenyl(triphenylphosphine)nickel(II),
[6-[[2,6-bis(2-propyl)phenylimino-κN)methyl]phenolato-κO]methyl(pyridine)nickel(II),
[6-[[2,6-bis(2-propyl)phenylimino-κN)methyl]phenolato-κO]phenyl(pyridine)nickel(II),
[2,4-bis(tert-butyl)-6-[(phenylimino-κN)methyl]phenolato-κO]dimethylnickel(II),
[2,4-bis(tert-butyl)-6-[(phenylimino-κN)methyl]phenolato-κO]methylphenylnickel(II),
[2,4-bis(tert-butyl)-6-[(phenylimino-κN)methyl]phenolato-κO]methyl(triphenylphosphine)nickel(II),
[2,4-bis(tert-butyl)-6-[(phenylimino-κN)methyl]phenolato-κO]phenyl(triphenylphosphine)nickel(II),
[2,4-bis(tert-butyl)-6-[(phenylimino-κN)methyl]phenolato-κO]methyl(pyridine)nickel(II),
[2,4-bis(tert-butyl)-6-[(phenylimino-κN)methyl]phenolato-κO]phenyl(pyridine)nickel(II),
[2,4-bis(tert-butyl)-6-[[2,6-bis(2-propyl)phenylimino-κN) methyl]phenolato-κO]dimethylnickel(II),
[2,4-bis(tert-butyl)-6-[[2,6-bis(2-propyl)phenylimino-κN) methyl]phenolato-κO]methylphenylnickel(II),
[2,4-bis(tert-butyl)-6-[[2,6-bis(2-propyl)phenylimino-κN) methyl]phenolato-κO]methyl(triphenylphosphine)nickel(II),
[2,4-bis(tert-butyl)-6-[[2,6-bis(2-propyl)phenylimino-κN) methyl]phenolato-κO]phenyl(triphenylphosphine)nickel(II),
[2,4-bis(tert-butyl)-6-[[2,6-bis(2-propyl)phenylimino-κN) methyl]phenolato-κO]methyl(pyridine)nickel(II),
[2,4-bis(tert-butyl)-6-[[2,6-bis(2-propyl)phenylimino-κN) methyl]phenolato-κO]phenyl(pyridine)nickel(II),
[2,4-diphenyl-6-[(phenylimino-κN)methyl]phenolato-κO] dimethylnickel(II),
[2,4-diphenyl-6-[(phenylimino-κN)methyl]phenolato-κO] methylphenylnickel(II),
[2,4-diphenyl-6-[(phenylimino-κN)methyl]phenolato-κO] methyl(triphenylphosphine)nickel(II),
[2,4-diphenyl-6-[(phenylimino-κN)methyl]phenolato-κO] phenyl(triphenylphosphine)nickel(II),
[2,4-diphenyl-6-[(phenylimino-κN)methyl]phenolato-κO] methyl(pyridine)nickel(II),
[2,4-diphenyl-6-[(phenylimino-κN)methyl]phenolato-κO] phenyl(pyridine)nickel(II),
[2,4-diphenyl-6-[[2,6-bis(2-propyl)phenylimino-κN]methyl]phenolato-κO]dimethylnickel(II),
[2,4-diphenyl-6-[[2,6-bis(2-propyl)phenylimino-κN]methyl]phenolato-κO]methylphenylnickel(II),
[2,4-diphenyl-6-[[2,6-bis(2-propyl)phenylimino-κN]methyl]phenolato-κO]methyl(triphenylphosphine)nickel(II),
[2,4-diphenyl-6-[[2,6-bis(2-propyl)phenylimino-κN]methyl]phenolato-κO]phenyl(triphenylphosphine)nickel(II),
[2,4-diphenyl-6-[[2,6-bis(2-propyl)phenylimino-κN]methyl]phenolato-κO]methyl(pyridine) nickel (II),
[2,4-diphenyl-6-[[2,6-bis(2-propyl)phenylimino-κN]methyl]phenolato-κO]phenyl(pyridine)nickel(II),
[2,4-dinitro-6-[(phenylimino-κN)methyl]phenolato-κO] dimethylnickel(II),
[2,4-dinitro-6-[(phenylimino-κN)methyl]phenolato-κO]methylphenylnickel(II),
[2,4-dinitro-6-[(phenylimino-κN)methyl]phenolato-κO]methyl(triphenylphosphine)nickel(II),
[2,4-dinitro-6-[(phenylimino-κN)methyl]phenolato-κO] phenyl(triphenylphosphine)nickel(II),
[2,4-dinitro-6-[(phenylimino-κN)methyl]phenolato-κO]methyl(pyridine)nickel(II),
[2,4-dinitro-6-[(phenylimino-κN)methyl]phenolato-κO] phenyl(pyridine)nickel(II),
[2,4-dinitro-6-[[2,6-bis(2-propyl)phenylimino-κN]methyl] phenolato-κO]dimethylnickel (II),
[2,4-dinitro-6-[[2,6-bis(2-propyl)phenylimino-κN]methyl] phenolato-κO]methylphenylnickel(II),
[2,4-dinitro-6-[[2,6-bis(2-propyl)phenylimino-κN]methyl] phenolato-κO]methyl(triphenylphosphine)nickel(II),
[2,4-dinitro-6-[[2,6-bis(2-propyl)phenylimino-κN]methyl] phenolato-κO]phenyl(triphenylphosphine)nickel(II),
[2,4-dinitro-6-[[2,6-bis(2-propyl)phenylimino-κN]methyl] phenolato-κO]methyl(pyridine)nickel(II),
[2,4-dinitro-6-[[2,6-bis(2-propyl)phenylimino-κN]methyl] phenolato-κO]phenyl(pyridine)nickel(II),
[2,4-dichloro-6-[(phenylimino-κN)methyl]phenolato-κO] dimethylnickel(II),
[2,4-dichloro-6-[(phenylimino-κN)methyl]phenolato-κO] methylphenylnickel(II),
[2,4-dichloro-6-[(phenylimino-κN)methyl]phenolato-κO] methyl(triphenylphosphine)nickel(II),
[2,4-dichloro-6-[(phenylimino-κN)methyl]phenolato-κO] phenyl(triphenylphosphine)nickel(II),

[2,4-dichloro-6-[(phenylimino-κN)methyl]phenolato-κO]
methyl(pyridine)nickel(II),
[2,4-dichloro-6-[(phenylimino-κN)methyl]phenolato-κO]
phenyl(pyridine)nickel(II),
[2,4-dichloro-6-[[2,6-bis(2-propyl)phenylimino-κN]methyl]phenolato-κO]dimethylnickel(II),
[2,4-dichloro-6-[[2,6-bis(2-propyl)phenylimino-κN]methyl]phenolato-κO]methylphenylnickel(II),
[2,4-dichloro-6-[[2,6-bis(2-propyl)phenylimino-κN]methyl]phenolato-κO]methyl(triphenylphosphine)nickel(II),
[2,4-dichloro-6-[[2,6-bis(2-propyl)phenylimino-κN]methyl]phenolato-κO]phenyl(triphenylphosphine)nickel(II),
[2,4-dichloro-6-[[2,6-bis(2-propyl)phenylimino-κN]methyl]phenolato-κO]methyl(pyridine)nickel(II),
[2,4-dichloro-6-[[2,6-bis(2-propyl)phenylimino-κN]methyl]phenolato-κO]phenyl(pyridine)nickel(II),
[2,4-dibromo-6-[(phenylimino-κN)methyl]phenolato-κO]
dimethylnickel(II),
[2,4-dibromo-6-[(phenylimino-κN)methyl]phenolato-κO]
methylphenylnickel(II),
[2,4-dibromo-6-[(phenylimino-κN)methyl]phenolato-κO]
methyl(triphenylphosphine)nickel(II),
[2,4-dibromo-6-[(phenylimino-κN)methyl]phenolato-κO]
phenyl(triphenylphosphine)nickel(II),
[2,4-dibromo-6-[(phenylimino-κN)methyl]phenolato-κO]
methyl(pyridine)nickel(II),
[2,4-dibromo-6-[(phenylimino-κN)methyl]phenolato-κO]
phenyl(pyridine)nickel(II),
[2,4-dibromo-6-[[2,6-bis(2-propyl)phenylimino-κN]methyl]phenolato-κO]dimethylnickel(II),
[2,4-dibromo-6-[[2,6-bis(2-propyl)phenylimino-κN]methyl]phenolato-κO]methylphenylnickel(II),
[2,4-dibromo-6-[[2,6-bis(2-propyl)phenylimino-κN]methyl]phenolato-κO]methyl(triphenylphosphine)nickel(II),
[2,4-dibromo-6-[[2,6-bis(2-propyl)phenylimino-κN]methyl]phenolato-κO]phenyl(triphenylphosphine)nickel(II),
[2,4-dibromo-6-[[2,6-bis(2-propyl)phenylimino-κN]methyl]phenolato-κO]methyl(pyridine)nickel(II),
[2,4-dibromo-6-[[2,6-bis(2-propyl)phenylimino-κN]methyl]phenolato-κO]phenyl(pyridine)nickel(II),
[6-[[(1,1':3',1"terphenyl-2'-yl)imino-κN]methyl]phenolate-κO]methyl(pyridine)nickel(II),
[6-[[(1,1':3',1"terphenyl-2'-yl)imino-κN]methyl]phenolate-κO]methyl(triphenylphosphine)nickel(II),
[6-[(phenylimino-κN)methyl]phenolato-κO]dimethyl palladium(II),
[6-[(phenylimino-κN)methyl]phenolato-κO]methylphenyl palladium(II),
[6-[(phenylimino-κN)methyl]phenolato-κO]methyl(triphenyl phosphine)palladium(II),
[6-[(phenylimino-κN)methyl]phenolato-κO]phenyl(triphenyl phosphine)palladium(II),
[6-[(phenylimino-κN)methyl]phenolato-κO]methyl(pyridine) palladium(II),
[6-[(phenylimino-κN)methyl]phenolato-κO]phenyl(pyridine) palladium(II),
[6-[[2,6-bis(2-propyl)phenylimino-κN]methyl]phenolato-κO]dimethylpalladium(II),
[6-[[2,6-bis(2-propyl)phenylimino-κN]methyl]phenolato-κO]methylphenylpalladium(II),
[6-[2,6-bis(2-propyl)phenylimino-κN)methyl]phenolato-κO]methyl(triphenylphosphine)palladium(II),
[6-[[2,6-bis(2-propyl)phenylimino-κN]methyl]phenolato-κO]phenyl(triphenylphosphine)palladium(II),
[6-[[2,6-bis(2-propyl)phenylimino-κN]methyl]phenolato-κO]methyl(pyridine)palladium(II),
[6-[[2,6-bis(2-propyl)phenylimino-κN]methyl]phenolato-κO]phenyl(pyridine)palladium(II),
[2,4-bis(tert-butyl)-6-[(phenylimino-κN)methyl]phenolato-κO]dimethylpalladium(II),
[2,4-bis(tert-butyl)-6-[(phenylimino-κN)methyl]phenolato-κO]methylphenylpalladium(II),
[2,4-bis(tert-butyl)-6-[(phenylimino-κN)methyl]phenolato-κO]methyl(triphenylphosphine)palladium(II),
[2,4-bis(tert-butyl)-6-[(phenylimino-κN)methyl]phenolato-κO]phenyl(triphenylphosphine)palladium(II),
[2,4-bis(tert-butyl)-6-[(phenylimino-κN)methyl]phenolato-κO]methyl(pyridine)palladium(II),
[2,4-bis(tert-butyl)-6-[(phenylimino-κN)methyl]phenolato-κO]phenyl(pyridine)palladium(II),
[2,4-bis(tert-butyl)-6-[[2,6-bis(2-propyl)phenylimino-κN)
methyl]phenolato-κO]dimethylpalladium(II),
[2,4-bis(tert-butyl)-6-[[2,6-bis(2-propyl)phenylimino-κN)
methyl]phenolato-κO]methylphenylpalladium(II),
[2,4-bis(tert-butyl)-6-[[2,6-bis(2-propyl)phenylimino-κN)
methyl]phenolato-κO]methyl(triphenylphosphine) palladium(II),
[2,4-bis(tert-butyl)-6-[[2,6-bis(2-propyl)phenylimino-κN)
methyl]phenolato-κO]phenyl(triphenylphosphine) palladium(II),
[2,4-bis(tert-butyl)-6-[[2,6-bis(2-propyl)phenylimino-κN)
methyl]phenolato-κO]methyl(pyridine)palladium(II),
[2,4-bis(tert-butyl)-6-[[2,6-bis(2-propyl)phenylimino-κN)
methyl]phenolato-κO]phenyl(pyridine)palladium(II),
[2,4-diphenyl-6-[(phenylimino-κN)methyl]phenolato-κO]
dimethylpalladium(II),
[2,4-diphenyl-6-[(phenylimino-κN)methyl]phenolato-κO]
methylphenylpalladium(II),
[2,4-diphenyl-6-[(phenylimino-κN)methyl]phenolato-κO]
methyl(triphenylphosphine)palladium(II),
[2,4-diphenyl-6-[(phenylimino-κN)methyl]phenolato-κO]
phenyl(triphenylphosphine)palladium(II),
[2,4-diphenyl-6-[(phenylimino-κN)methyl]phenolato-κO]
methyl(pyridine)palladium(II),
[2,4-diphenyl-6-[(phenylimino-κN)methyl]phenolato-κO]
phenyl(pyridine)palladium(II),
[2,4-diphenyl-6-[[2,6-bis(2-propyl)phenylimino-κN]methyl]phenolato-κO]dimethylpalladium(II),
[2,4-diphenyl-6-[[2,6-bis(2-propyl)phenylimino-κN]methyl]phenolato-κO]methylphenylpalladium(II),
[2,4-diphenyl-6-[[2,6-bis(2-propyl)phenylimino-κN]methyl]phenolato-κO]methyl(triphenylphosphine)palladium
(II),
[2,4-diphenyl-6-[[2,6-bis(2-propyl)phenylimino-κN]methyl]phenolato-κO]phenyl(triphenylphosphine)palladium
(II),
[2,4-diphenyl-6-[[2,6-bis(2-propyl)phenylimino-κN]methyl]phenolato-κO]methyl(pyridine)palladium(II),
[2,4-diphenyl-6-[[2,6-bis(2-propyl)phenylimino-κN]methyl]phenolato-κO]phenyl(pyridine)palladium(II),
[2,4-dinitro-6-[(phenylimino-κN)methyl]phenolato-κO]
dimethylpalladium(II),
[2,4-dinitro-6-[(phenylimino-κN)methyl]phenolato-κO]methylphenylpalladium(II),
[2,4-dinitro-6-[(phenylimino-κN)methyl]phenolato-κO]methyl(triphenylphosphine)palladium(II),
[2,4-dinitro-6-[(phenylimino-κN)methyl]phenolato-κO]
phenyl(triphenylphosphine)palladium(II),
[2,4-dinitro-6-[(phenylimino-κN)methyl]phenolato-κO]methyl(pyridine)palladium(II),
[2,4-dinitro-6-[(phenylimino-κN)methyl]phenolato-κO]
phenyl(pyridine)palladium(II),

[2,4-dinitro-6-[[2,6-bis(2-propyl)phenylimino-κN]methyl]phenolato-κO]dimethylpalladium(II),
[2,4-dinitro-6-[[2,6-bis(2-propyl)phenylimino-κN]methyl]phenolato-κO]methylphenylpalladium(II),
[2,4-dinitro-6-[[2,6-bis(2-propyl)phenylimino-κN]methyl]phenolato-κO]methyl(triphenylphosphine)palladium(II),
[2,4-dinitro-6-[[2,6-bis(2-propyl)phenylimino-κN]methyl]phenolato-κO]phenyl(triphenylphosphine)palladium(II),
[2,4-dinitro-6-[[2,6-bis(2-propyl)phenylimino-κN]methyl]phenolato-κO]methyl(pyridine)palladium(II),
[2,4-dinitro-6-[[2,6-bis(2-propyl)phenylimino-κN]methyl]phenolato-κO]phenyl(pyridine)palladium(II),
[2,4-dichloro-6-[(phenylimino-κN)methyl]phenolato-κO]dimethylpalladium(II),
[2,4-dichloro-6-[(phenylimino-κN)methyl]phenolato-κO]methylphenylpalladium(II),
[2,4-dichloro-6-[(phenylimino-κN)methyl]phenolato-κO]methyl(triphenylphosphine)palladium(II),
[2,4-dichloro-6-[(phenylimino-κN)methyl]phenolato-κO]phenyl(triphenylphosphine)palladium(II),
[2,4-dichloro-6-[(phenylimino-κN)methyl]phenolato-κO]methyl(pyridine)palladium(II),
[2,4-dichloro-6-[(phenylimino-κN)methyl]phenolato-κO]phenyl(pyridine)palladium(II),
[2,4-dichloro-6-[[2,6-bis(2-propyl)phenylimino-κN]methyl]phenolato-κO]dimethylpalladium(II),
[2,4-dichloro-6-[[2,6-bis(2-propyl)phenylimino-κN]methyl]phenolato-κO]methylphenylpalladium(II),
[2,4-dichloro-6-[[2,6-bis(2-propyl)phenylimino-κN]methyl]phenolato-κO]methyl(triphenylphosphine)palladium(II),
[2,4-dichloro-6-[[2,6-bis(2-propyl)phenylimino-κN]methyl]phenolato-κO]phenyl(triphenylphosphine)palladium(II),
[2,4-dichloro-6-[[2,6-bis(2-propyl)phenylimino-κN]methyl]phenolato-κO]methyl(pyridine)palladium(II),
[2,4-dichloro-6-[[2,6-bis(2-propyl)phenylimino-κN]methyl]phenolato-κO]phenyl(pyridine)palladium(II),
[2,4-dibromo-6-[(phenylimino-κN)methyl]phenolato-κO]dimethylpalladium(II),
[2,4-dibromo-6-[(phenylimino-κN)methyl]phenolato-κO]methylphenylpalladium(II),
[2,4-dibromo-6-[(phenylimino-κN)methyl]phenolato-κO]methyl(triphenylphosphine)palladium(II),
[2,4-dibromo-6-[(phenylimino-κN)methyl]phenolato-κO]phenyl(triphenylphosphine)palladium(II),
[2,4-dibromo-6-[(phenylimino-κN)methyl]phenolato-κO]methyl(pyridine)palladium(II),
[2,4-dibromo-6-[(phenylimino-κN)methyl]phenolato-κO]phenyl(pyridine)palladium(II),
[2,4-dibromo-6-[[2,6-bis(2-propyl)phenylimino-κN]methyl]phenolato-κO]dimethylpalladium(II),
[2,4-dibromo-6-[[2,6-bis(2-propyl)phenylimino-κN]methyl]phenolato-κO]methylphenylpalladium(II),
[2,4-dibromo-6-[[2,6-bis(2-propyl)phenylimino-κN]methyl]phenolato-κO]methyl(triphenylphosphine)palladium(II),
[2,4-dibromo-6-[[2,6-bis(2-propyl)phenylimino-κN]methyl]phenolato-κO]phenyl(triphenylphosphine)palladium(II),
[2,4-dibromo-6-[[2,6-bis(2-propyl)phenylimino-κN]methyl]phenolato-κO]methyl(pyridine)palladium(II),
[2,4-dibromo-6-[[2,6-bis(2-propyl)phenylimino-κN]methyl]phenolato-κO]phenyl(pyridine)palladium(II),
[6-[[(1,1':3',1''terphenyl-2'-yl)imino-κN]methyl]phenolate-κO]methyl(pyridine)palladium(II), and
[6-[[(1,1':3',1''terphenyl-2'-yl)imino-κN]methyl]phenolate-κO]methyl(triphenylphosphine)palladium(II).

Examples of the transition metal compound represented by the formula (4-1) are
(acetonitrile)[N,N'-(1,2-ethanediylidene)bis(benzenamine-κN)]methylnickel(II),
[N,N'-(1,2-ethanediylidene)bis(benzenamine-κN)]methyl(pyridine)nickel(II),
[N,N'-(1,2-ethanediylidene)bis(benzenamine-κN)]methyl(triphenylphosphine)nickel(II),
[N,N'-(1,2-ethanediylidene)bis(benzenamine-κN)]methyl nickel(II) chloride,
[N,N'-(1,2-ethanediylidene)bis(benzenamine-κN)]methyl nickel(II) bromide,
[N,N'-(1,2-ethanediylidene)bis(benzenamine-κN)]nickel(II) dichloride,
[N,N'-(1,2-ethanediylidene)bis(benzenamine-κN)]nickel(II) dibromide,
(acetonitrile)[N,N'-(1,2-ethanediylidene)bis(2,6-dimethylbenzenamine-κN)]methylnickel(II),
[N,N'-(1,2-ethanediylidene)bis(2,6-dimethylbenzenamine-κN)]methyl(pyridine)nickel(II),
[N,N'-(1,2-ethanediylidene)bis(2,6-dimethylbenzenamine-κN)]methyl(triphenylphosphine)nickel(II),
[N,N'-(1,2-ethanediylidene)bis(2,6-dimethylbenzenamine-κN)]methylnickel(II) chloride,
[N,N'-(1,2-ethanediylidene)bis(2,6-dimethylbenzenamine-κN)]methylnickel(II) bromide,
[N,N'-(1,2-ethanediylidene)bis(2,6-dimethylbenzenamine-κN)]nickel(II) dichloride,
[N,N'-(1,2-ethanediylidene)bis(2,6-dimethylbenzenamine-κN)]nickel(II) dibromide,
(acetonitrile)[N,N'-(1,2-ethanediylidene)bis[2,6-bis(2-propyl)benzenamine-κN]]methylnickel(II),
[N,N'-(1,2-ethanediylidene)bis[2,6-bis(2-propyl)benzenamine-κN]]methyl(pyridine)nickel(II),
[N,N'-(1,2-ethanediylidene)bis[2,6-bis(2-propyl)benzenamine-κN]]methyl(triphenylphosphine)nickel(II),
[N,N'-(1,2-ethanediylidene)bis[2,6-bis(2-propyl)benzenamine-κN]]methylnickel(II) chloride,
[N,N'-(1,2-ethanediylidene)bis[2,6-bis(2-propyl)benzenamine-κN]]methylnickel(II) bromide,
[N,N'-(1,2-ethanediylidene)bis[2,6-bis(2-propyl)benzenamine-κN]]nickel(II) dichloride,
[N,N'-(1,2-ethanediylidene)bis[2,6-bis(2-propyl)benzenamine-κN]]nickel(II) dibromide,
(acetonitrile)[N,N'-(1,2-dimethyl-1,2-ethanediylidene)bis(benzenamine-κN)]methylnickel(II),
[N,N'-(1,2-dimethyl-1,2-ethanediylidene)bis(benzenamine-κN)]methyl(pyridine)nickel(II),
[N,N'-(1,2-dimethyl-1,2-ethanediylidene)bis(benzenamine-κN)]methyl(triphenylphosphine)nickel(II),
[N,N'-(1,2-dimethyl-1,2-ethanediylidene)bis(benzenamine-κN)]methylnickel(II) chloride,
[N,N'-(1,2-dimethyl-1,2-ethanediylidene)bis(benzenamine-κN)]methylnickel(II) bromide,
[N,N'-(1,2-dimethyl-1,2-ethanediylidene)bis(benzenamine-κN)]nickel(II) dichloride,
[N,N'-(1,2-dimethyl-1,2-ethanediylidene)bis(benzenamine-κN)]nickel(II) dibromide,
(acetonitrile)[N,N'-(1,2-dimethyl-1,2-ethanediylidene)bis(2,6-dimethylbenzenamine-κN)]methylnickel(II),
[N,N'-(1,2-dimethyl-1,2-ethanediylidene)bis(2,6-dimethylbenzenamine-κN)]methyl(pyridine)nickel(II),
[N,N'-(1,2-dimethyl-1,2-ethanediylidene)bis(2,6-dimethylbenzenamine-κN)]methyl(triphenylphosphine)nickel(II),

[N,N'-(1,2-dimethyl-1,2-ethanediylidene)bis(2,6-dimethyl benzenamine-κN)]methylnickel(II) chloride,
[N,N'-(1,2-dimethyl-1,2-ethanediylidene)bis(2,6-dimethyl benzenamine-κN)]methylnickel(II) bromide,
[N,N'-(1,2-dimethyl-1,2-ethanediylidene)bis(2,6-dimethyl benzenamine-κN)]nickel(II) dichloride,
[N,N'-(1,2-dimethyl-1,2-ethanediylidene)bis(2,6-dimethyl benzenamine-κN)]nickel(II) dibromide,
(acetonitrile)[N,N'-(1,2-dimethyl-1,2-ethanediylidene)bis[2,6-bis(2-propyl)benzenamine-κN]]methylnickel(II),
[N,N'-(1,2-dimethyl-1,2-ethanediylidene)bis[2,6-bis(2-propyl) benzenamine-κN]]methyl(pyridine)nickel(II),
[N,N'-(1,2-dimethyl-1,2-ethanediylidene)bis[2,6-bis(2-propyl) benzenamine-κN]]methyl(triphenylphosphine)nickel(II),
[N,N'-(1,2-dimethyl-1,2-ethanediylidene)bis[2,6-bis(2-propyl) benzenamine-κN]]methylnickel(II) chloride,
[N,N'-(1,2-dimethyl-1,2-ethanediylidene)bis[2,6-bis(2-propyl) benzenamine-κN]]methylnickel(II) bromide,
[N,N'-(1,2-dimethyl-1,2-ethanediylidene)bis[2,6-bis(2-propyl) benzenamine-κN]]nickel(II) dichloride,
[N,N'-(1,2-dimethyl-1,2-ethanediylidene)bis[2,6-bis(2-propyl) benzenamine-κN]]nickel(II) dibromide,
(acetonitrile)[N,N'-(1,2-ethanediylidene)bis(benzenamine-κN)]methylpalladium(II),
[N,N'-(1,2-ethanediylidene)bis(benzenamine-κN)]methyl(pyridine)palladium(II),
[N,N'-(1,2-ethanediylidene)bis(benzenamine-κN)]methyl(triphenylphosphine)palladium(II),
[N,N'-(1,2-ethanediylidene)bis(benzenamine-κN)]methyl palladium(II) chloride,
[N,N'-(1,2-ethanediylidene)bis(benzenamine-κN)]methyl palladium(II) bromide,
[N,N'-(1,2-ethanediylidene)bis(benzenamine-κN)]palladium(II) dichloride,
[N,N'-(1,2-ethanediylidene)bis(benzenamine-κN)]palladium(II) dibromide,
(acetonitrile)[N,N'-(1,2-ethanediylidene)bis(2,6-dimethyl benzenamine-κN)]methylpalladium(II),
[N,N'-(1,2-ethanediylidene)bis(2,6-dimethylbenzenamine-κN)]methyl(pyridine)palladium(II),
[N,N'-(1,2-ethanediylidene)bis(2,6-dimethylbenzenamine-κN)]methyl(triphenylphosphine)palladium(II),
[N,N'-(1,2-ethanediylidene)bis(2,6-dimethylbenzenamine-κN)]methylpalladium(II) chloride,
[N,N'-(1,2-ethanediylidene)bis(2,6-dimethylbenzenamine-κN)]methylpalladium(II) bromide,
[N,N'-(1,2-ethanediylidene)bis(2,6-dimethylbenzenamine-κN)]palladium(II) dichloride,
[N,N'-(1,2-ethanediylidene)bis(2,6-dimethylbenzenamine-κN)]palladium(II) dibromide,
(acetonitrile)[N,N'-(1,2-ethanediylidene)bis[2,6-bis(2-propyl)benzenamine-κN]]methylpalladium(II),
[N,N'-(1,2-ethanediylidene)bis[2,6-bis(2-propyl)benzenamine-κN]]methyl(pyridine)palladium(II),
[N,N'-(1,2-ethanediylidene)bis[2,6-bis(2-propyl)benzenamine-κN]]methyl(triphenylphosphine)palladium(II),
[N,N'-(1,2-ethanediylidene)bis[2,6-bis(2-propyl)benzenamine-κN]]methylpalladium(II) chloride,
[N,N'-(1,2-ethanediylidene)bis[2,6-bis(2-propyl)benzenamine-κN]]methylpalladium(II) bromide,
[N,N'-(1,2-ethanediylidene)bis[2,6-bis(2-propyl)benzenamine-κN]]palladium(II) dichloride,
[N,N'-(1,2-ethanediylidene)bis[2,6-bis(2-propyl)benzenamine-κN]]palladium(II) dibromide,
(acetonitrile)[N,N'-(1,2-dimethyl-1,2-ethanediylidene)bis(benzenamine-κN)]methylpalladium(II),
[N,N'-(1,2-dimethyl-1,2-ethanediylidene)bis(benzenamine-κN)]methyl(pyridine)palladium(II),
[N,N'-(1,2-dimethyl-1,2-ethanediylidene)bis(benzenamine-κN)]methyl(triphenylphosphine)palladium(II),
[N,N'-(1,2-dimethyl-1,2-ethanediylidene)bis(benzenamine-κN)]methylpalladium(II) chloride,
[N,N'-(1,2-dimethyl-1,2-ethanediylidene)bis(benzenamine-κN)]methylpalladium(II) bromide,
[N,N'-(1,2-dimethyl-1,2-ethanediylidene)bis(benzenamine-κN)]palladium(II) dichloride,
[N,N'-(1,2-dimethyl-1,2-ethanediylidene)bis(benzenamine-κN)]palladium(II) dibromide,
(acetonitrile)[N,N'-(1,2-dimethyl-1,2-ethanediylidene)bis(2,6-dimethylbenzenamine-κN)]methylpalladium(II),
[N,N'-(1,2-dimethyl-1,2-ethanediylidene)bis(2,6-dimethyl benzenamine-κN)]methyl(pyridine)palladium(II),
[N,N'-(1,2-dimethyl-1,2-ethanediylidene)bis(2,6-dimethyl benzenamine-κN)]methyl(triphenylphosphine)palladium(II),
[N,N'-(1,2-dimethyl-1,2-ethanediylidene)bis(2,6-dimethyl benzenamine-κN)]methylpalladium(II) chloride,
[N,N'-(1,2-dimethyl-1,2-ethanediylidene)bis(2,6-dimethyl benzenamine-κN)]methylpalladium(II) bromide,
[N,N'-(1,2-dimethyl-1,2-ethanediylidene)bis(2,6-dimethyl benzenamine-κN)]palladium(II) dichloride,
[N,N'-(1,2-dimethyl-1,2-ethanediylidene)bis(2,6-dimethyl benzenamine-κN)]palladium(II) dibromide,
(acetonitrile)[N,N'-(1,2-dimethyl-1,2-ethanediylidene)bis[2,6-bis(2-propyl)benzenamine-κN]]methylpalladium(II),
[N,N'-(1,2-dimethyl-1,2-ethanediylidene)bis[2,6-bis(2-propyl) benzenamine-κN]]methyl(pyridine)palladium(II),
[N,N'-(1,2-dimethyl-1,2-ethanediylidene)bis[2,6-bis(2-propyl) benzenamine-κN]]methyl(triphenylphosphine)palladium(II),
[N,N'-(1,2-dimethyl-1,2-ethanediylidene)bis[2,6-bis(2-propyl) benzenamine-κN]]methylpalladium(II) chloride,
[N,N'-(1,2-dimethyl-1,2-ethanediylidene)bis[2,6-bis(2-propyl) benzenamine-κN]]methylpalladium(II) bromide,
[N,N'-(1,2-dimethyl-1,2-ethanediylidene)bis[2,6-bis(2-propyl) benzenamine-κN]]palladium(II) dichloride, and
[N,N'-(1,2-dimethyl-1,2-ethanediylidene)bis[2,6-bis(2-propyl) benzenamine-κN]]palladium(II) dibromide.

The transition metal compound represented by the formula (2) is further preferably a transition metal compound represented by the following formula (5):

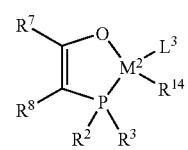

(5)

wherein $M^2$ is a transition metal atom of the group 10 in the periodic table of elements; $L^3$ is a neutral ligand coordinating to $M^2$ through a lone pair of electrons; and $R^{14}$ is a hydrogen atom, an aromatic hydrocarbyl group or an aliphatic hydrocarbyl group.

$M^2$ in the formula (5) is a nickel atom or a palladium atom, and preferred is a nickel atom.

Examples of the aromatic hydrocarbyl group of $R^{14}$ in the formula (5) are a phenyl group, a 4-methylphenyl group, a naphthyl group, a benzyl group, and a phenylethyl group. Examples of the aliphatic hydrocarbyl group thereof are a linear saturated hydrocarbyl group such as a methyl group, an ethyl group, a n-propyl group, a n-butyl group, an isopropyl group, a sec-butyl group, a tert-butyl group, a cyclopropyl group, a cyclobutyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group; a branched saturated hydrocarbyl group such as a sec-pentyl group, a neopentyl group, a sec-hexyl group, a sec-heptyl group, a sec-octyl group, a sec-nonyl group, a sec-decyl group, a sec-undecyl group, a sec-dodecyl group, a sec-tridecyl group, a sec-tetradecyl group, a sec-pentadecyl group, a sec-hexadecyl group, a sec-heptadecyl group, a sec-octadecyl group, a sec-nonadecyl group, and a sec-eicosyl group; and a cyclic saturated hydrocarbyl group such as a cyclopentyl group, a cyclohexyl group, a cycloheptyl group, a cyclooctyl group, a cyclononyl group, a cyclodecyl group, a cycloundecyl group, a cyclododecyl group, a cyclotridecyl group, a cyclotetradecyl group, a cyclopentadecyl group, a cyclohexadecyl group, a cycloheptadecyl group, a cyclooctadecyl group, a cyclononadecyl group, and a cycloeicosyl group. Among them, preferred is a phenyl group.

Examples of the neutral ligand of $L^3$ in the formula (5) are a phosphine derivative and a pyridine derivative. Specific examples of the phosphine derivative are triphenylphosphine, dimethylphenylphosphine, tri-n-butylphosphine, bis(diphenylphosphino)butane, bis(diphenylphosphino)propane, and tri-n-butylphosphine oxide. Specific examples of the pyridine derivative are pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,4,6-trimethylpyridine, 2,6-di-tert-butylpyridine, and 2,4-di-tert-butylpyridine. Among them, preferred is triphenylphosphine or pyridine.

Examples of the transition metal compound represented by the formula (5) are all the above-exemplified transition metal compounds as the transition metal compound represented by the above formula (2-1).

The transition metal compound represented by the formula (5) is particularly preferably a transition metal compound represented by the following formula (6):

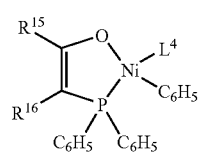

(6)

wherein $R^{15}$ is a 4-methylphenyl group or a trifluoromethyl group; $R^{16}$ is a group of a sulfonate salt or an aliphatic hydrocarbyl ester group; and $L^4$ is triphenylphosphine or pyridine.

A combination of $R^{15}$, $R^{16}$ and $L^4$ in the formula (6) is preferably a combination of a 4-methylphenyl group of $R^{15}$, a group of a sulfonate salt of $R^{16}$ and pyridine of $L^4$, or a combination of a trifluoromethyl group of $R^{15}$, an aliphatic hydrocarbyl ester group of $R^{16}$ and pyridine of $L^4$.

Examples of the transition metal compound represented by the formula (6) and satisfying the above-mentioned combination are [sodium 1-(diphenylphosphino-κP)-2-(hydroxo-κO)-2-(4-methylphenyl)ethenesulfonate]phenyl(pyridine)nickel(II), and [methyl-2-(diphenylphosphino-κP)-4,4,4-trifluoro-3-(hydroxo-κO)-2-butenoate]phenyl(pyridine)nickel(II).

The transition metal compound represented by the formula (6) can easily be produced by a process comprising the step of contacting a commercially available nickel(cyclooctadiene) complex, a phosphor ylide having a target structure, and a coordination compound ($L^4$) with one another under heating and stirring. Examples of a prior literature disclosing said production process are the following literatures (1) and (2):

(1) Journal of Molecular Catalysis, number 41, pages 123-134, published on Mar. 4, 1987 by Elsevier (Netherlands), authored by U. Klabunde and S. D. Ittel; and (2) Macromolecules, volume 20, number 34, pages 2438-2442, published on Mar. 16, 2001 by ACS Publications (America), authored by R. Soula, J. P. Broyer, M. F. Llauro, A. Tomov, R. Spitz, J. Clayerie, X. Drujon, J. Malinge, and T. Saudemont.

Examples of a process for producing a specific transition metal compound are as follows:

(1) [sodium 1-(diphenylphosphino-κP)-2-(hydroxo-κO)-2-(4-methylphenyl)ethenesulfonate]phenyl(pyridine)nickel (II) can be produced in 91% yield by a process comprising the steps of (1-1) reacting commercially available 2-bromo-4'-methylacetophenone with commercially available triphenylphosphine according to a method disclosed in Journal of the American Chemical Society, volume 22, number 124, pages 6244-6245, published on Jun. 5, 2002 by ACS Publications (America), authored by Viktor P. Balema, Jerzy W. Wiench, Marek Pruski, and Vitalij K. Pecharsky, thereby producing 4-methylbenzoylmethylenetriphenylphosphorane, (1-2) reacting 4-methylbenzoylmethylenetriphenylphosphorane, commercially available sulfur trioxide/pyridine salt, and sodium hydroxide according to a method disclosed in U.S. Pat. No. 4,377,529, thereby producing sodium 2-(triphenylphosphoranylide)-2-oxo-2-(4-methylphenyl)ethenesulfonate, (1-3) mixing sodium 2-(triphenylphosphoranylide)-2-oxo-2-(4-methylphenyl)ethene sulfonate with a commercially available bis(1,5-cyclooctadiene)nickel complex in a stoichiometrically equivalent amount in a tetrahydrofuran solvent in the presence of pyridine, thereby obtaining a mixture, and (1-4) stirring the mixture for 18 hours at a room temperature; and (2) [methyl-2-(diphenylphosphino-κP)-4,4,4-trifluoro-3-(hydroxo-κO)-2-butenoate]phenyl(pyridine)nickel(II) can be produced in 85% yield by a process comprising the steps of (2-1) reacting commercially available methyl triphenylphosphoranylideneacetate with commercially available trifluoroacetic anhydride according to a method disclosed in Journal of Organic Chemistry, volume 20, number 53, pages 5558-5562, published on Nov. 11, 1988 by ACS Publications (America), authored by Bruce C. Hamper, thereby producing methyl 4,4,4-trifluoro-3-oxo-2-(triphenylphosphoranylide) butanoate, (2-2) mixing 4,4,4-trifluoro-3-oxo-2-(triphenyl phosphoranylide)butanoate with a commercially available bis(1,5-cyclooctadiene)nickel complex in a stoichiometrically equivalent amount in a tetrahydrofuran solvent in the presence of pyridine, thereby obtaining a mixture, and (2-3) stirring the mixture for 18 hours at a room temperature.

The copolymer of the present invention contains an olefin unit in an amount of usually 1 to 99.9% by mole, and preferably 40 to 99.9% by mole, and a unit of the compound represented by the formula (1) in an amount of usually 0.1 to 99% by mole, and preferably 0.1 to 60% by mole, the total amount of both units being 100% by mole. Those amounts can be controlled by regulating an amount of the olefin used in the process of the present invention, an amount of the compound represented by the formula (1) used therein, and a ratio of an amount of water to an amount of a highly polar organic solvent in a mixed solvent of water with a highly polar organic solvent used for polymerization.

Physical properties of the copolymer in the present invention can be changed by an amount of a unit of the compound represented by the formula (1) contained in the copolymer, as shown in the following three cases (1) to (3), the total amount of said unit and an olefin unit being 100% by mole:

(1) a copolymer containing a unit of the compound represented by the formula (1) in an amount of about 3% by mole or smaller has both physical properties of a polymer containing only an olefin unit (namely, homopolymer of the olefin) and a cation-exchange property or a proton acidity derived from the compound represented by the formula (1); and an exchange of a mono-valent cationic species (X) contained in the copolymer with an appropriate multi-valent cationic species makes an expectation that the copolymer has electrostatic interactions among its polymer molecules to show excellent stiffness and elasticity;

(2) a copolymer containing a unit of the compound represented by the formula (1) in an amount of about 3% to about 10% by mole has such a further improved hydrophilic property that it shows different physical properties from those of the copolymer mentioned in the above section (1), and an appropriate selection of carbon chain length of $R^1$ contained in the compound represented by the formula (1) makes solubility of the copolymer in a polar solvent, which expects an application of the copolymer to a dispersing agent such as an additive agent for a polymer and filler; and (3) a copolymer containing a unit of the compound represented by the formula (1) in an amount of about 10% by mole or larger generally has water solubility, which can make an application of the copolymer to a hydrophilic material such as a water retention agent blended with concrete and an antistatic agent.

Examples of a method for contacting an olefin and the compound represented by the formula (1) with a polymerization catalyst in the process of the present invention (namely, a method for copolymerizing an olefin with the compound represented by the formula (1) in the presence of a polymerization catalyst) are a solution polymerization method, a bulk polymerization method, a slurry polymerization method, and a suspension polymerization method. Among them, preferred is a solution polymerization method.

An olefin concentration in a polymerization system is not particularly limited. When using ethylene as the olefin, its partial pressure in a polymerization system is preferably 0.1 to 40 MPa, more preferably 0.1 to 20 MPa, and further preferably 0.1 to 3 MPa.

In case of a solution polymerization method, a concentration of the compound represented by the formula (1) in a polymerization system is not particularly limited. Said concentration is preferably 0.1 to 50% by weight, and more preferably 0.5 to 30% by weight, wherein the total amount of the olefin, the compound represented by the formula (1), a polymerization catalyst, and a polymerization solvent contained in a polymerization system is 100% by weight.

In case of a solution polymerization method, a concentration of a polymerization catalyst in a polymerization system is not particularly limited. Said concentration is preferably $1 \times 10^{-8}$ g/mL-solvent to $1 \times 10^{-2}$ g/mL-solvent, and more preferably $1 \times 10^{-7}$ g/mL-solvent to $1 \times 10^{-4}$ g/mL-solvent.

The polymerization catalyst in the present invention may be a mixture containing a polymerization catalyst, which mixture can be obtained, for example, by mixing a transition metal(1,5-cyclooctadiene) complex known in the art with a coordination compound corresponding to a ligand contained in a target polymerization catalyst, inside or outside a polymerization system.

A copolymerization time is suitably determined according to an amount of an olefin unit contained in a target copolymer, an amount of a unit of the compound represented by the formula (1) contained therein, and a structure of a polymerization reactor. It is usually 10 minutes to 40 hours, and preferably 10 minutes to 4 hours.

Copolymerization temperature is not particularly limited. It is preferably 0 to 150° C., more preferably 30 to 120° C., and further preferably 70 to 100° C.

A polymerization solvent used in a solution polymerization method is not particularly limited, and may be any solvent generally used in a solution polymerization method. It is suitably selected according to a copolymerization temperature. Examples of the polymerization solvent are toluene, hexane, heptane, methanol, ethanol, propanol, isopropanol, butanol, acetone and nitromethane. The above-mentioned highly polar organic solvent is an organic solvent having relative permittivity of 18 or larger at room temperature. It is preferably methanol, ethanol, 1-propanol, 2-propanol, butanol, acetone, or nitromethane. Preferred is water, a highly polar organic solvent, or a mixed solvent of water with a highly polar organic solvent in order to disperse homogeneously the compound represented by the formula (1) in a solvent. The above-mentioned solvents may be used in combination of two or more thereof.

Examples of an embodiment using a mixed solvent of water with a highly polar organic solvent are (1) an embodiment of mixing water with a highly polar organic solvent, and using the obtained mixed solvent; and (2) an embodiment of using a highly polar organic solvent containing water, which is generally available commercially. An amount of water contained in said mixed solvent is not particularly limited. Said amount is usually 0.001 to 1,000 parts by weight per one part by weight of a highly polar organic solvent, or 0.001 part by weight to an upper limit of an amount (parts by weight) of water mixable with a highly polar organic solvent.

Examples of a method of using the compound represented by the formula (1) in the process of the present invention are (i) a method of using the compound solely, (ii) a method of using a solution of the compound dissolved in water, a highly polar organic solvent, or a mixed solvent of water with a highly polar organic solvent, and (iii) a method of using a slurry of the compound dispersed in water, a highly polar organic solvent, or a mixed solvent of water with a highly polar organic solvent. Examples of a method for preparing said solution or slurry are (a) a method of stirring a combination of the compound represented by the formula (1) with water, a highly polar organic solvent, or a mixed solvent of water with a highly polar organic solvent, (b) a method of shaking said combination, (c) a method of supersonically vibrating said combination, and (d) a method of heating said combination. The above-mentioned method (ii) is not particularly limited in a concentration of the compound represented by the formula (1) in the solution. Said concentration is preferably $1 \times 10^{-8}$ g/mL-solvent to 10 g/mL-solvent, and more preferably $1 \times 10^{-4}$ g/mL-solvent to 1 g/mL-solvent. The above-mentioned method (iii) is not particularly limited in a concentration of the compound represented by the formula (1) in the slurry. Said concentration is usually 1 to 10,000 parts by weight of the compound represented by the formula (1) per 100 parts by weight of the solvent.

The solution or slurry in the above-mentioned method (ii) or (iii) and a polymerization catalyst are not particularly limited in their feeding order to a polymerization reactor.

Examples of the feeding order are (a) an order of feeding the solution or slurry, and then feeding the polymerization catalyst, (b) feeding the solution or slurry and the polymerization catalyst at the same time, and (c) an order of feeding the polymerization catalyst, and then feeding the solution or slurry. When using a gaseous olefin, it is permitted to take an order of feeding the gaseous olefin, and then feeding the solution or slurry and the polymerization catalyst under pressure. When using a liquid olefin, a feeding order thereof is not particularly limited.

According to the present invention, there can be provided a copolymer containing a functional group of a sulfonic acid or its salt in an arbitrary amount, and a process for producing said copolymer.

Examples of use of said copolymer are as follows:

(1) a copolymer containing a unit of the compound represented by the formula (1) in an amount of about 3% by mole or smaller (above-mentioned case (1)) is so excellent in its stiffness and elasticity compared with an olefin homopolymer as to be used as a modified olefin polymer;

(2) a copolymer containing a unit of the compound represented by the formula (1) in an amount of about 3% to about 10% (above-mentioned case (2)) is so excellent in its ion-conductivity as to be used as a separating membrane for a battery; and (3) a copolymer containing a unit of the compound represented by the formula (1) in an amount of about 10% by mole or larger (above-mentioned case (3)) is so excellent in its water solubility as to be used as a water-retention agent for concrete, or a particle-adsorbing resin, or so excellent in its proton-conductivity as to be used as an electrolyte for a fuel battery.

EXAMPLE

The present invention is explained with reference to the following Examples, which do not limit the scope of the present invention.

Example 1

A stainless steel-made 400 mL autoclave was dried thoroughly, and its inner gas (air) was replaced with nitrogen gas. There was put 97 mL of purified toluene (polymerization solvent) with a syringe in the autoclave, and stirring thereof was started. There were added thereto 2.0 mL of an aqueous solution (concentration: 2.3 mole/L) of sodium vinylsulfonate (compound represented by the formula (1)) manufactured by Tokyo Chemical Industry Co., Ltd., and 1 mL of an ethanol solution (concentration: 10 mg/mL) of [sodium 1-(diphenylphosphino-κP)-2-(hydroxo-κO)-2-(4-methylphenyl)ethenesulfonate]phenyl(pyridine) nickel(II) (polymerization catalyst), in this order. All the above-mentioned operations were conducted at ordinary temperature and ordinary pressure. Then, ethylene (olefin) was added thereto up to 4.0 MPa under pressure. The resultant mixture was heated up to 70° C., and sodium vinylsulfonate and ethylene were copolymerized with each other for 4 hours after the arrival of the copolymerization temperature at 70° C.

After completion of the copolymerization, the remaining ethylene was purged from the autoclave, and the reaction mixture was poured into 500 mL of denatured alcohol to precipitate a white powdery copolymer. The white powdery copolymer was filtered off, and was washed repeatedly and alternately using water and using a mixed solvent of water with denatured alcohol containing them in an equal amount by volume, and was further washed one time with denatured alcohol. The washed white powdery copolymer was dried at 80° C. for about 3 hours, thereby obtaining 0.17 g of a copolymer.

$^1$H NMR analysis of the copolymer showed a signal (1.0 to 2.0 ppm) of a hydrogen atom assigned to polyethylene; a broad signal (2.2 ppm) of a hydrogen atom linked to a carbon atom, which is situated next to a carbon atom linked to a functional group of a sulfonic acid; and a broad signal (3.7 ppm) of a hydrogen atom linked to a carbon atom, which is linked to a functional group of a sulfonic acid.

An amount of a functional group of a sulfonic acid contained in the copolymer was determined by calculating a ratio of an integration value of the above-mentioned signals to an integration value of a signal assigned to a methylene structure of polyethylene, which concluded that the copolymer was an ethylene-sodium vinylsulfonate copolymer containing 54% by mole of an ethylene unit and 46% by mole of a sodium vinylsulfonate unit.

The above-mentioned $^1$H NMR analysis was measured under the following conditions:

measuring instrument: 400 MHz NMR, AL400 (trade name), manufactured by JEOL LTD.;

measuring temperature: room temperature (however, 135° C. in the following Example 2);

solvent: deuterated water-d2 (however, o-dichlorobenzene-d4 in the following Example 2); and sample concentration: 50 mg/mL.

Example 2

A stainless steel-made 40 mL autoclave was dried thoroughly, and its inner gas (air) was replaced with nitrogen gas. There was put 20 mL of purified toluene (polymerization solvent) with a syringe in the autoclave, and stirring thereof was started. There were added thereto 1.8 mL of an aqueous solution (concentration: 2.3 mole/L) of sodium vinylsulfonate (compound represented by the formula (1)) manufactured by Tokyo Chemical Industry Co., Ltd., and 1 mL of a toluene solution (concentration: 1 mg/mL) of [methyl-2-(diphenylphosphino-κP)-4,4,4-trifluoro-3-(hydroxo-κO)-2-butenoate]phenyl(pyridine)nickel(II) (polymerization catalyst), in this order. All the above-mentioned operations were conducted at ordinary temperature and ordinary pressure. Then, ethylene (olefin) was added thereto up to 0.6 MPa under pressure. The resultant mixture was heated up to 70° C., and sodium vinylsulfonate and ethylene were copolymerized with each other for 3 hours after the arrival of the copolymerization temperature at 70° C.

After completion of the copolymerization, the remaining ethylene was purged from the autoclave, and the reaction mixture was poured into 100 mL of denatured alcohol to precipitate a white powdery copolymer. The white powdery copolymer was filtered off, and was washed repeatedly and alternately using water and using a mixed solvent of water with denatured alcohol, which contained them in an equal amount by volume, and was further washed one time with denatured alcohol. The washed white powdery copolymer was dried at 80° C. for about 3 hours, thereby obtaining 0.23 g of a copolymer. The copolymer had a melting point of 120° C. together with a shoulder signal at about 107° C.

$^1$H NMR analysis of the copolymer showed a signal (1.0 to 2.0 ppm) of a hydrogen atom assigned to polyethylene, and a signal (3.7 ppm) of a hydrogen atom linked to a carbon atom, which is linked to a functional group of a sulfonic acid. Other signals could not be identified specifically because of signal overlapping thereof with signals of a base polymer (i.e., polyethylene).

The copolymer was an ethylene-sodium vinylsulfonate copolymer containing 99.5% by mole of an ethylene unit and 0.5% by mole of a sodium vinylsulfonate unit, which was determined by calculating a ratio of an integration value of the above-mentioned signals to an integration value of a signal assigned to a methylene structure of polyethylene.

The above-mentioned melting point was measured using a differential scanning calorimeter (DSC) under the following conditions:
- measuring instrument: DSC, RDC 220 (trade name), manufactured by Seiko Instruments Inc.;
- measuring temperature range: −120 to 140° C.;
- rate of temperature increase or decrease: 10° C./minute; and
- sample amount: 3 mg.

What is claimed is:

1. A copolymer comprising (i) an olefin unit selected from the group consisting of ethylene unit and an α-olefin unit having 3 to 20 carbon atoms, and (ii) a unit of a compound represented by the following formula (1),

(1)

wherein m is a number of 0 or 1; $R^1$ is an aliphatic hydrocarbylene group having 1 to 18 carbon atoms; and X is a monovalent cationic species except a proton ion.

2. The copolymer according to claim 1, wherein the olefin unit is contained in the copolymer in an amount of 1 to 99.9% by mole, and the unit of the compound represented by the formula (1) is contained in the copolymer in an amount of 0.1 to 99% by mole, the total amount of both units being 100% by mole.

3. The copolymer according to claim 1, wherein the olefin unit is an ethylene unit.

4. The copolymer according to claim 1, wherein $R^1$ is a linear aliphatic hydrocarbylene group having 1 to 18 carbon atoms.

5. A process for producing a copolymer containing an olefin unit and a unit of a compound represented by the following formula (1), which comprises the step of contacting (i) one or more olefins selected from the group consisting of ethylene and an α-olefin having 3 to 20 carbon atoms, and (ii) one or more compounds represented by the following formula (1) with a polymerization catalyst,

(1)

wherein m is a number of 0 or 1; $R^1$ is an aliphatic hydrocarbylene group having 1 to 18 carbon atoms; and X is a monovalent cationic species.

6. The process for producing a copolymer according to claim 5, wherein the olefin unit is contained in the copolymer in an amount of 1 to 99.9% by mole, and the unit of the compound represented by the formula (1) is contained in the copolymer in an amount of 0.1 to 99% by mole, the total amount of both units being 100% by mole.

7. The process for producing a copolymer according to claim 5, wherein the polymerization catalyst is a transition metal compound represented by the following formula (2), (3) or (4):

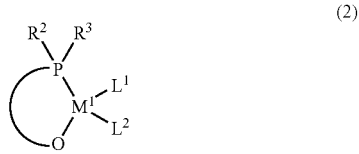

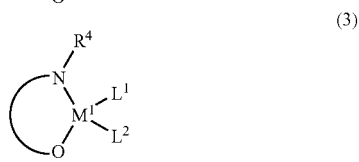

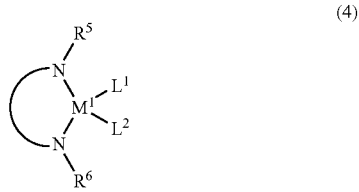

halogen atom, an aromatic hydrocarbyl group, an aliphatic hydrocarbyl group or a neutral ligand coordinating wherein $M^1$ is a transition metal atom of the groups 8 to 10 in the periodic table of elements; the curved line between the phosphor atom and the oxygen atom in the formula (2), the curved line between the nitrogen atom and the oxygen atom in the formula (3), and the curved line between the two nitrogen atoms in the formula (4) are a hydrocarbylene group having two or more carbon atoms; $R^2$, $R^3$, $R^4$, $R^5$ and $R^6$ are independently of one another an aromatic hydrocarbyl group or an aliphatic hydrocarbyl group; and $L^1$ and $L^2$ are independently of each other a hydrogen atom, a to $M^1$ through a lone pair of electrons.

8. The process for producing a copolymer according to claim 5, wherein the polymerization catalyst is a transition metal compound represented by the following formula (5):

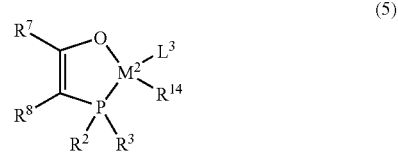

wherein $M^2$ is a transition metal atom of the group 10 in the periodic table of elements; $L^3$ is a neutral ligand coordinating to $M^2$ through a lone pair of electrons; $R^2$ and $R^3$ are independently of each other an aromatic hydrocarbyl group or an aliphatic hydrocarbyl group; $R^7$ is an aromatic hydrocarbyl group or a halogenated hydrocarbyl group; $R^8$ is a group of a sulfonate salt, an aliphatic hydrocarbyl ester group having 1 to 10 carbon atoms, or a carboxyl group; and $R^{14}$ is a hydrogen atom, an aromatic hydrocarbyl group or an aliphatic hydrocarbyl group.

9. The process for producing a copolymer according to claim 5, wherein the polymerization catalyst is a transition metal compound represented by the following formula (6):

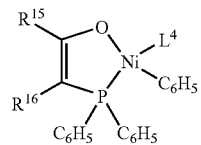 (6)

wherein $R^{15}$ is a 4-methylphenyl group or a trifluoromethyl group; $R^{16}$ is a group of a sulfonate salt or an aliphatic hydrocarbyl ester group; and $L^4$ is triphenylphosphine or pyridine.

10. The process for producing a copolymer according to claim 5, wherein the contacting step is carried out in water, a highly polar organic solvent, or a mixed solvent of water with a highly polar organic solvent.

11. The process for producing a copolymer according to claim 5, wherein the compound represented by the formula (1) is a solution or slurry thereof dissolved or suspended in water, a highly polar organic solvent, or a mixed solvent of water with a highly polar organic solvent.

* * * * *